(12) United States Patent
King et al.

(10) Patent No.: US 12,241,426 B2
(45) Date of Patent: Mar. 4, 2025

(54) SYSTEMS AND METHODS OF CONTROLLING LOAD SHARE AND SPEED OF ENGINES IN MULTIPLE-ENGINE PROPULSION SYSTEMS

(71) Applicant: General Electric Company, Schenectady, NY (US)

(72) Inventors: Christopher David King, Salem, MA (US); Jessie Thorup, Malden, MA (US)

(73) Assignee: General Electric Company, Evendale, OH (US)

( * ) Notice: Subject to any disclaimer, the term of this patent is extended or adjusted under 35 U.S.C. 154(b) by 741 days.

(21) Appl. No.: 16/238,777

(22) Filed: Jan. 3, 2019

(65) Prior Publication Data
US 2020/0217253 A1  Jul. 9, 2020

(51) Int. Cl.
*F02D 25/00* (2006.01)
*F02D 29/02* (2006.01)

(52) U.S. Cl.
CPC ............. *F02D 25/00* (2013.01); *F02D 29/02* (2013.01)

(58) Field of Classification Search
CPC ......... F02D 25/00; B64D 31/00; B64D 31/10; F02C 6/02
See application file for complete search history.

(56) References Cited

U.S. PATENT DOCUMENTS

| | | | |
|---|---|---|---|
| 3,930,366 A | * | 1/1976 | Nelson .................. F02C 9/42 60/39.15 |
| 3,963,372 A | * | 6/1976 | McLain ................. B64C 27/14 60/39.15 |
| 4,147,035 A | | 4/1979 | Moore et al. |
| 5,687,082 A | | 11/1997 | Rizzoni |
| 5,771,482 A | | 6/1998 | Rizzoni |
| 6,302,356 B1 | | 10/2001 | Hawkins |
| 6,408,834 B1 | | 6/2002 | Brackney et al. |
| 6,557,530 B1 | | 5/2003 | Benson et al. |
| 6,602,057 B2 | | 8/2003 | Saxena et al. |
| 6,823,834 B2 | | 11/2004 | Benson et al. |

(Continued)

FOREIGN PATENT DOCUMENTS

JP    S63266132 A * 4/1987 ................ F02C 7/36

OTHER PUBLICATIONS

Wikipedia "Proportional Control" (Year: 2015).*

(Continued)

*Primary Examiner* — Arun Goyal
*Assistant Examiner* — William L Breazeal
(74) *Attorney, Agent, or Firm* — Dority & Manning, P.A.

(57) ABSTRACT

Provided are systems and methods of controlling load share in a multi-engine propulsion system. A load share participation value indicative of a load share participation regime for a first engine may be received and a load sharing requirement control command for the first engine may be output. The load share participation value may depend or be based at least in part on one or more operating conditions of a second engine. The load sharing requirement control command for the first engine may depend on whether the load share participation value indicates a full-participation load share regime for the first engine, a partial-participation load share regime for the first engine, or a non-participation load share regime for the first engine.

20 Claims, 11 Drawing Sheets

(56) References Cited

U.S. PATENT DOCUMENTS

| | | |
|---|---|---|
| 6,990,855 B2 | 1/2006 | Tuken et al. |
| 7,206,688 B2 | 4/2007 | Wang et al. |
| 7,275,514 B2 | 10/2007 | Kuo et al. |
| 7,540,270 B2 | 6/2009 | Kang et al. |
| 7,721,686 B2 | 5/2010 | Lindgarde |
| 7,784,451 B2 | 8/2010 | Chi |
| 8,105,018 B2 | 1/2012 | Gockel et al. |
| 8,302,397 B2 | 11/2012 | Liu et al. |
| 8,428,849 B2 | 4/2013 | Maruyama et al. |
| 8,437,946 B2 | 5/2013 | Sasaki et al. |
| 8,468,821 B2 | 6/2013 | Liu et al. |
| 8,504,175 B2 | 8/2013 | Pekar et al. |
| 8,640,679 B2 | 2/2014 | Wang et al. |
| 9,181,835 B2 | 11/2015 | Aliyev |
| 9,206,756 B2 | 12/2015 | Zhu et al. |
| 9,217,362 B2 | 12/2015 | Wang et al. |
| 9,228,511 B2 | 1/2016 | Zhu et al. |
| 9,291,093 B2 | 3/2016 | Wang et al. |
| 9,297,319 B2 | 3/2016 | Wang et al. |
| 9,347,401 B2 | 5/2016 | Zhu et al. |
| 9,394,838 B2 | 7/2016 | Guralp et al. |
| 9,500,138 B1 | 11/2016 | Cai et al. |
| 9,677,493 B2 | 6/2017 | Stewart et al. |
| 9,683,503 B2 | 6/2017 | Zhang et al. |
| 9,689,335 B2 | 6/2017 | Ge |
| 9,732,625 B2 | 8/2017 | Cai |
| 9,777,657 B2 | 10/2017 | Wang et al. |
| 9,821,916 B2 | 11/2017 | Massot |
| 9,835,099 B2 | 12/2017 | Zhu et al. |
| 9,874,160 B2 | 1/2018 | D'Amato et al. |
| 9,885,297 B2 | 2/2018 | Wang et al. |
| 9,932,918 B2 | 4/2018 | Haskara et al. |
| 10,006,375 B1 | 6/2018 | Wagner et al. |
| 10,036,331 B2 | 7/2018 | Cai et al. |
| 2011/0184623 A1 | 7/2011 | De Boer |
| 2015/0081193 A1* | 3/2015 | Gordon ............... F02C 9/42 701/100 |
| 2017/0152856 A1 | 6/2017 | Grassens et al. |
| 2017/0218815 A1 | 8/2017 | Stewart et al. |
| 2018/0072430 A1 | 3/2018 | Misfeldt |
| 2020/0049025 A1* | 2/2020 | Morgan ............... F02C 9/56 |

OTHER PUBLICATIONS

Andoga et al., Digital Electronic Control of a Small Turbojet Engine MPM 20, Acta Polytechnica Hungarica, Department of Cybernetics and Artificial Intelligence, Faculty of Informatics and Electrical Engineering, Slovakia, vol. 4, Issue 4, 2007, 13 Pages.

European Search Report Corresponding to Application No. 19206181 on May 15, 2020.

* cited by examiner

SYSTEMS AND METHODS OF CONTROLLING LOAD SHARE AND SPEED OF ENGINES IN MULTIPLE-ENGINE PROPULSION SYSTEMS

FEDERALLY SPONSORED RESEARCH

This invention was made with Government support under contract number W58RGZ-16-C-0047 awarded by the United States Department of Defense, Army Contracting Command. The Government has certain rights in this invention.

FIELD

The present disclosure generally pertains to systems and methods of controlling the load share and speed of engines in multiple-engine propulsion systems, including systems and methods of controlling the load share and speed in propulsion systems for rotary-wing or fixed-wing aircraft.

BACKGROUND

A rotary-wing or a fixed-wing aircraft may be equipped with a propulsion system that has multiple engines such as turbomachines. The multiple engines may be coupled to a gearbox that allows each of the multiple engines to contribute a portion of the power required for the flight plan, or the multiple engines may operate independently from one another. Under normal operating conditions, typically it is desirable for each of the multiple engines to output a substantially equal torque. A mismatch in torque may be acceptable during upset conditions, such in the event of an outage or an operational problem with one of the multiple engines. However, a prolonged or recurring exposure to differences in torque as between the multiple engines may introduce uneven wear of an engine or gearbox, potentially damaging or reducing the useful life of such engine or gearbox. Additionally, an engine that chronically carries a greater proportion of the total load of the multiple engines may have a reduced useful life or may require more frequent maintenance. Further, such a mismatch in torque may reduce the responsiveness of the multiple engines to changes in power output requirements.

Systems that utilize multiple engines typically operate under a control system configured to control both the speed and the torque of each respective engine. Under normal operating conditions, such a control system typically seeks to match the speed and the output torque among the multiple engines. Engine speed and output torque are closely coupled variables, meaning that a change in one typically results in a change in the other. Control systems tend to utilize decoupling schemes with limited bandwidth to reduce adverse interactions between respective control loops for speed and output torque of an engine. However, decoupling schemes tend to slow the response rate of the engine, which consequently decreases the responsiveness of the engine.

Accordingly, there exists a need for improved systems and methods of controlling engines, including systems and methods providing for improved engine responsiveness.

BRIEF DESCRIPTION

Aspects and advantages will be set forth in part in the following description, or may be obvious from the description, or may be learned through practicing the presently disclosed subject matter.

In one aspect, the present disclosure embraces methods of controlling load share between a plurality of engines, such as in a multi-engine propulsion system. An exemplary method includes receiving a load share participation value indicative of a load share participation regime for a first engine and outputting a load sharing requirement control command for the first engine, where the load share participation value depends at least in part on one or more operating conditions of a second engine. The load sharing requirement control command for the first engine may depend on whether the load share participation value indicates a full-participation load share regime for the first engine, a partial-participation load share regime for the first engine, or a non-participation load share regime for the first engine. When the load share participation value indicates a full-participation load share regime or a partial-participation load share regime for the first engine, the load sharing requirement control command for the first engine may be configured to change a torque or thrust output of the first engine for purposes of load sharing. When the load share participation value indicates a non-participation load share regime for the first engine, the load sharing requirement control command for the first engine may cause a change in the torque or thrust of the first engine, but either prevents or does not cause a decrease in fuel flow to the first engine for purposes of load sharing.

In some embodiments, an exemplary method may include receiving an engine speed value corresponding to an engine speed sensor operably coupled to the first engine and performing a comparison of the engine speed value to an engine speed reference value for the first engine. An exemplary method may additionally or alternatively include receiving a first engine torque or thrust value corresponding to the first engine and a second engine torque or thrust value corresponding to the second engine, and performing a comparison of the first engine torque or thrust value to the second engine torque or thrust value. Either or both of these comparisons may be utilized in the exemplary method. For example, an exemplary method may include outputting the load sharing requirement control command for the first engine based at least in part on the comparison of the engine speed value to the engine speed reference value for the second engine and/or the comparison of the first engine torque or thrust value to the second engine torque or thrust value.

An exemplary method may additionally or alternatively include receiving a load share participation value indicative of a load share participation regime for the second engine, and outputting a load sharing requirement control command for the second engine. The load share participation value may depend at least in part on one or more operating conditions of the first engine. When the load share participation value indicates a full-participation load share regime or a partial-participation load share regime for the second engine, the load sharing requirement control command for the second engine may be configured to change a torque or thrust output of the second engine for purposes of load sharing. When the load share participation value indicates a non-participation load share regime for the second engine, the load sharing requirement control command for the second engine may be configured to cause a change in the torque or thrust of the second engine, but such that the load sharing requirement control command for the second engine either prevents or does not cause a decrease in fuel flow to the second engine for purposes of load sharing.

In some embodiments, an exemplary method may include receiving an engine speed value corresponding to an engine speed sensor operably coupled to the second engine and performing a comparison of the engine speed value to an engine speed reference value for the second engine. An exemplary method may additionally or alternatively include performing a comparison of the second engine torque or thrust value to the first engine torque or thrust value. Further, an exemplary method may include outputting the load sharing requirement control command for the second engine based at least in part on the comparison of the engine speed value to the engine speed reference value for the second engine and/or the comparison of the second engine torque or thrust value to the first engine torque or thrust value.

When the load share participation value indicates a full-participation load share regime or a partial-participation load share regime for the first engine, the load sharing requirement control command may include: a control command configured to control fuel flow; a control command configured to control a variable geometry component; a control command configured to control a bleed valve position of the first engine; a control command configured to change an acceleration schedule and/or a deceleration schedule of the first engine; and/or a control command configured to control a bypass ratio, the bypass ratio being a ratio of the amount of airflow through a bypass airflow passage to the amount of airflow through an inlet of the first engine.

When the load share participation value indicates a non-participation load share regime for the first engine, the load sharing requirement control command may include: a control command configured to increase fuel flow; a control command configured to control a variable geometry component; a control command configured to control a bleed valve position of the first engine; a control command configured to change an acceleration schedule and/or a deceleration schedule of the first engine; and/or a control command configured to control a bypass ratio, the bypass ratio being a ratio of the amount of airflow through a bypass airflow passage to the amount of airflow through an inlet of the first engine. In some embodiments, an exemplary method may include not outputting a load sharing requirement control command for the first engine when the load share participation value indicates a non-participation load share regime for the first engine, or outputting a load sharing requirement control command for the first engine that does not cause the first engine to decrease torque or thrust for purposes of load sharing.

By way of example, an exemplary method may include outputting a load sharing requirement control command for the first engine that includes a control command configured to control fuel flow when the load share participation value indicates a full-participation load share regime for the first engine; and/or outputting a load sharing requirement control command for the first engine that includes a control command configured to control a variable geometry component when the load share participation value indicates a partial-participation load share regime for the first engine. In some embodiments, an exemplary method may include outputting a load sharing requirement control command for the first engine that includes a control command configured to control fuel flow only when the load share participation value indicates a full-participation load share regime for the first engine. When the load sharing requirement control command includes a control command configured to control one or more variable geometry components, the one or more variable geometry components may include one or more variable position guide vanes, one or more variable position compressor blades, one or more variable position turbine blades, one or more variable position outlet guide vanes, and/or one or more variable position fan blades.

In exemplary embodiments, the first engine and the second engine may include turbomachine engines. The first engine and the second engine may be part of a propulsion system for a rotary-wing aircraft or a fixed-wing aircraft. Exemplary methods may be performed at least in part using a multi-input-single-output controller. Exemplary methods may be performed at least in part using a full authority digital engine control system, an electronic engine controller, or an electronic control unit.

In another aspect, the present disclosure embraces a multiple engine propulsions system. An exemplary multiple engine propulsion system may include a first engine, a second engine, and a load share control system. The first engine may have a first one or more sensors associated therewith that are configured to ascertain one or more operating conditions associated with the first engine. The second engine may have a second one or more controllable components associated therewith that are configured to change a torque or thrust output of the second engine. The load share control system may be configured to ascertain a load share participation value indicative of a load share participation regime for the second engine and to output a load sharing requirement control command to the second one or more controllable components associated with the second engine. The load share participation value for the second engine may be based at least in part on the one or more operating conditions associated with the first engine.

The load share control system may be configured to output a load sharing requirement control command to the second one or more controllable components associated with the second engine, with the load sharing requirement control command based or depending at least in part on the load share participation value. When the load share participation value indicates a full-participation load share regime or a partial-participation load share regime for the second engine, the load share control system may output to the second one or more controllable components associated with the second engine a load sharing requirement control command configured to change a torque or thrust output of the second engine for purposes of load sharing. When the load share participation value indicates a non-participation load share regime for the second engine, output to the second one or more controllable components associated with the second engine a load sharing requirement control command that may cause a change in the torque or thrust of the second engine, but either prevents or does not cause a decrease in fuel flow to the second engine for purposes of load sharing.

In some embodiments, the first one or more sensors may include at least one sensor configured to ascertain a torque or thrust output of the first engine. Additionally, or in the alternative, in some embodiments the second engine may have a second one or more sensors associated therewith, and the second one or more sensors may include at least one sensor configured to ascertain a speed of the second engine and at least one sensor configured to ascertain a torque or thrust output of the second engine. In exemplary embodiments, a load share control system may be configured to receive an engine speed value from the at least one sensor configured to ascertain a speed of the second engine and compare the engine speed value to an engine speed reference value for the second engine. A load share control system may be additionally or alternatively configured to receive a first engine torque or thrust value from the at least one sensor configured to ascertain a torque or thrust output of the first engine, and receive a second engine torque or thrust value from the at least one sensor configured to ascertain a torque or thrust output of the second engine, and compare the first engine torque or thrust value to the second engine torque or thrust value.

An exemplary load share control system may be configured to ascertain a load sharing requirement control command for the second engine based at least in part on the comparison of the engine speed value to the engine speed reference value for the second engine and/or the comparison of the first engine torque or thrust value to the second engine torque or thrust value. Additionally, or in the alternative, an exemplary load share control system may be configured to output to the second one or more controllable components associated with the second engine, a load sharing requirement control command for the second engine based at least in part on the comparison of the engine speed value to the engine speed reference value for the second engine and/or the comparison of the first engine torque or thrust value to the second engine torque or thrust value.

In some embodiments, an exemplary multiple engine propulsions system may include a first output shaft operably coupling the first engine to a gearbox and a second output shaft operably coupling the second engine to the gearbox. The first engine and the second engine may include turbomachine engines. The gearbox may be operably coupled to a main rotor assembly of a rotary-wing aircraft.

In yet another aspect, the present disclosure embraces computer-readable medium that include computer-executable instructions, which, when executed by a processor operably coupled to an engine control system, cause the engine control system to perform one or more functions described herein. An exemplary computer-readable medium may include computer-executable instructions configured to cause the engine control system to ascertain a load share participation value indicative of a load share participation regime for a first engine and to output a load sharing requirement control command for the first engine. The load share participation value may be depending or based at least in part on one or more operating conditions of a second engine. The load sharing requirement control command for the first engine may be configured to change a torque or thrust output of the first engine for purposes of load sharing when the load share participation value indicates a full-participation load share regime or a partial-participation load share regime for the first engine. Conversely, when the load share participation value indicates a non-participation load share regime for the first engine, the load sharing requirement control command for the first engine may cause a change in the torque or thrust of the first engine, but may be configured so as to either prevent or not cause a decrease in fuel flow to the first engine for purposes of load sharing.

In some embodiments, exemplary computer-executable instructions may be configured to cause an engine control system to receive an engine speed value corresponding to an engine speed sensor operably coupled to the first engine and compare the engine speed value to an engine speed reference value for the first engine. Additionally, or in the alternative, exemplary computer-executable instructions may be configured to cause an engine control system to receive a first engine torque or thrust value corresponding to the first engine and a second engine torque or thrust value corresponding to the second engine, and compare the first engine torque or thrust value to the second engine torque or thrust value. In exemplary embodiments, computer-executable instructions may be configured to cause an engine control system to ascertain and/or output a load sharing requirement control command for the first engine based at least in part on a comparison of an engine speed value to an engine speed reference value for the second engine and/or a comparison of a first engine torque or thrust value to a second engine torque or thrust value. The engine control system associated with the computer-readable medium may include a full authority digital engine control system, an electronic engine controller, or an electronic control unit, with the processor that executes the computer-executable instructions being a component of such full authority digital engine control system, electronic engine controller, or electronic control unit.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1A:
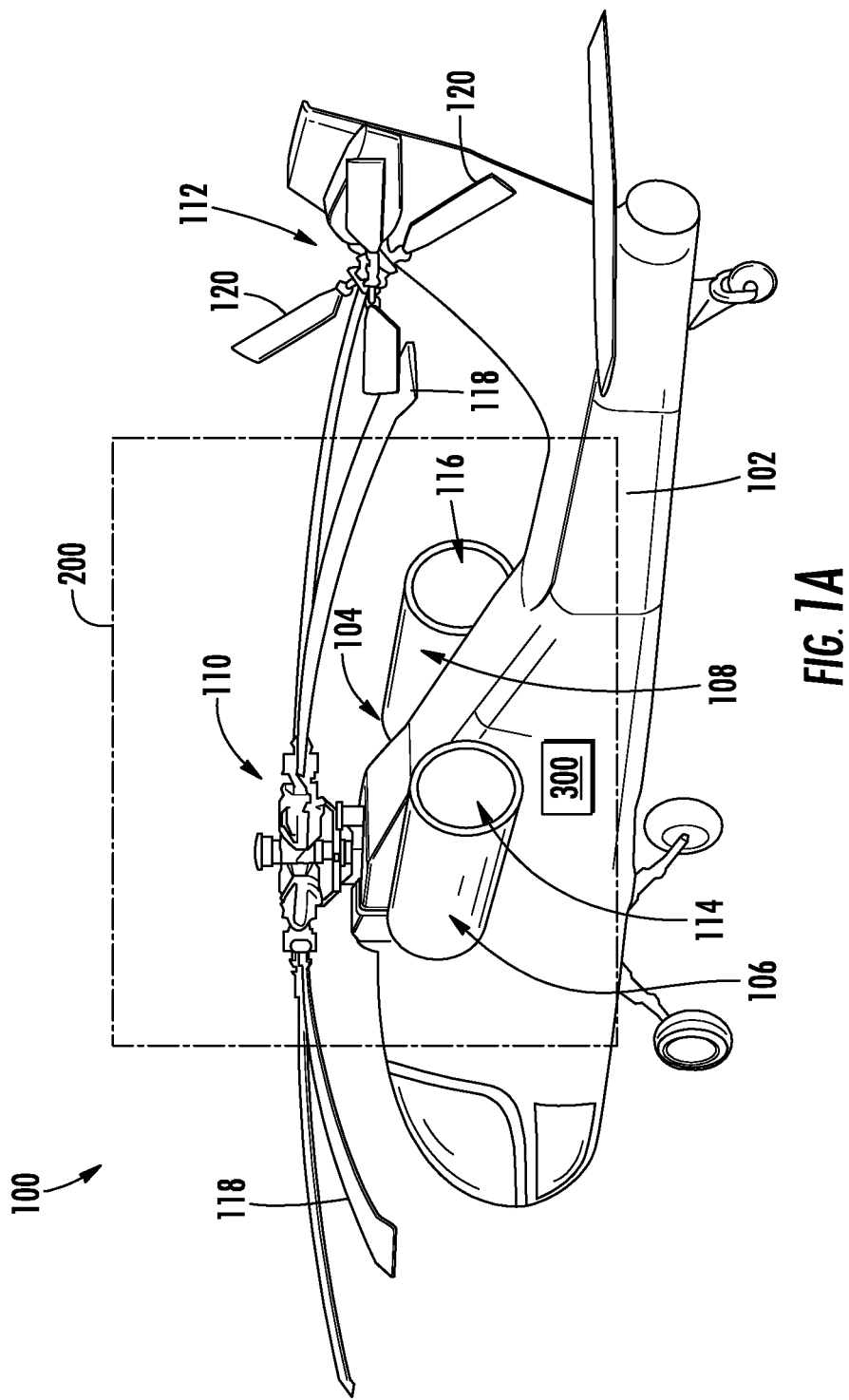
FIGS. 1A and 1B schematically depict exemplary aircraft that have a propulsion system with multiple engines.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides systems and methods of controlling load share of engines in multiple-engine propulsion systems, including systems and methods of controlling the load share in propulsion systems for rotary-wing or fixed-wing aircraft. The presently disclosed systems and methods utilize a load share participation value indicative of a load share participation regime for an engine to determine whether and the extent to which the engine may participate in load sharing. The load share participation value for the engine depends at least in part on the operating conditions of one or more other engines in the propulsion system. The load share participation value allows the engine to participate fully in load sharing when the other engines of the propulsion system are operating normally such that they are capable of also participating in load sharing. However, under some circumstances, a partial-participation load sharing regime may be utilized which may partially limit the nature or extent to which the engine may participate in load sharing. Further, in the event of abnormal operating conditions of one of the other engines of the propulsion system, a non-participating load sharing regime may be utilized. In this way, participating load sharing regimes may be utilized under normal operating conditions, allowing multiple engines to each adjust their load share so as to rapidly balance torque or thrust of the multiple engines without sacrificing the overall torque or thrust of the propulsion system. Conversely, in the event of an engine experiencing abnormal operating conditions such that the engine may not be able to further increase torque or thrust for purposes of load share, the other engine may operate according to a non-participating load sharing regime so as to avoid a decrease in torque or thrust for purposes of load sharing from compromising the overall torque or thrust of the propulsion system.

The presently disclosed systems and methods may be implemented using any desired control system or methodology, including multi-input-multi-output (MIMO) controllers, multi-input-single-output (MISO) controllers, H2-optimal controllers, H-infinity controllers, Mu-synthesis controllers, and so forth. The presently disclosed participating load sharing regimes allow for controllers with high bandwidth and corresponding improved responsiveness and faster transitions to steady-state load sharing, whether in the case of a transient or step-change response. By contrast, legacy systems typically addressed load share through spectrally separated engine speed control and engine torque or thrust control utilizing low bandwidth, which leads to a delay in achieving steady-state load sharing. The improved responsiveness and faster transitions to steady-state load sharing of the presently disclosed systems and methods may reduce wearing and extend the useful life or maintenance cycles of engines and/or gearboxes that may otherwise result from prolonged or recurring exposure to differences in torque.

The presently disclosed systems and methods may be implemented in any setting. Some examples include propulsion systems that utilize multiple engines to power aircraft, marine vessels, motor vehicles, power generation facilities, manufacturing facilities, industrial machinery, and the like. In the context of an aircraft, the presently disclosed systems and methods may be utilized in fixed or rotary wing aircraft, including commercial, military, or civilian aircraft, as well as unmanned aircraft such as unmanned aerial vehicles, drones, and the like. It will be appreciated that the presently disclosed systems and methods may be useful in numerous other settings, and it is intended that the presently disclosed the presently disclosed systems and methods may be implemented with a propulsion systems that utilize multiple engines in any setting without departing from the spirit or scope of the present disclosure.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Figure 1B:
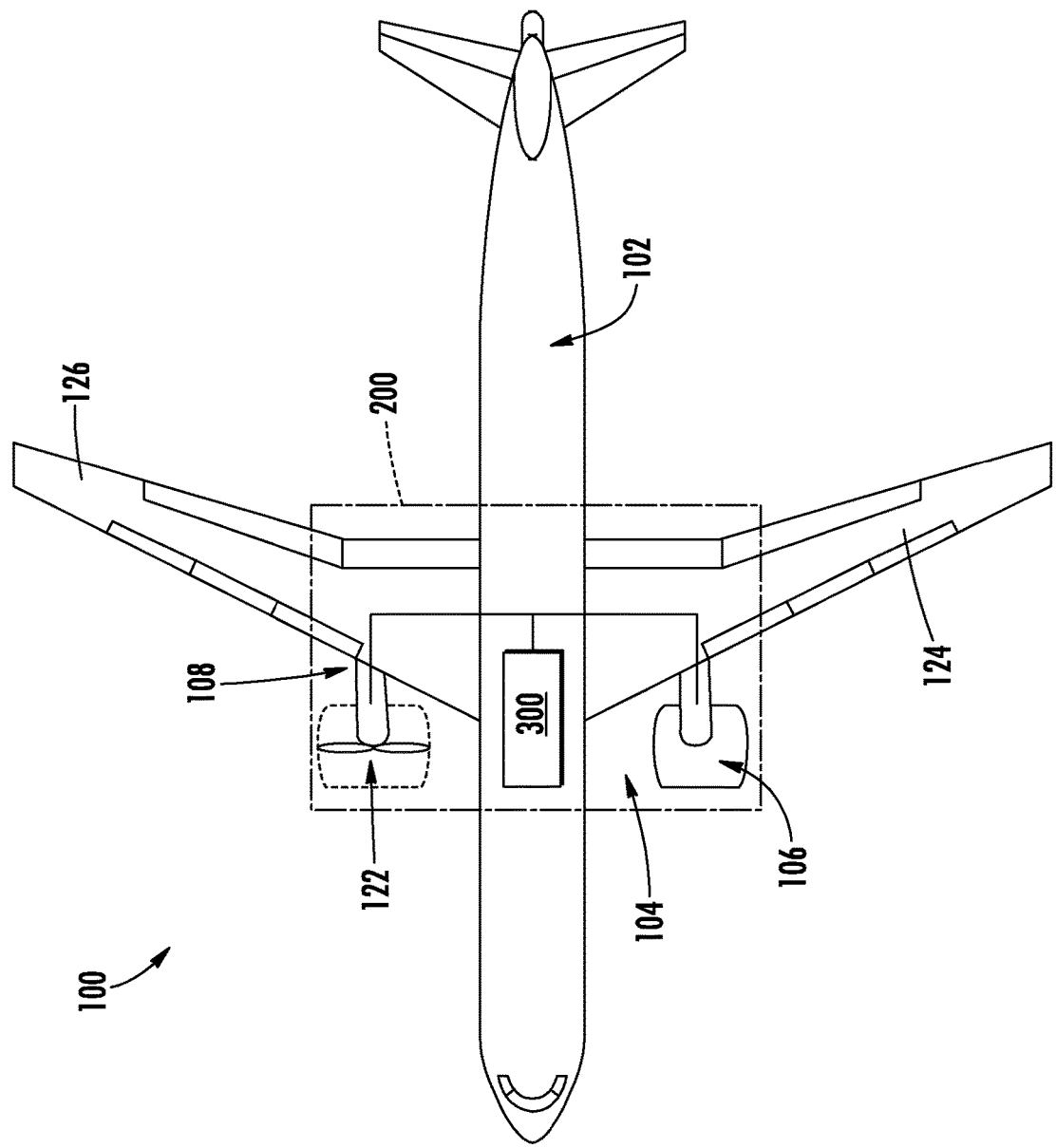

Exemplary embodiments of the present disclosure will now be described in further detail. FIGS. 1A and 1B show exemplary aircraft 100 in accordance with various embodiments of the present disclosure. An exemplary aircraft 100 includes a propulsion system 200 and an engine control system 300 configured to control certain operations of the propulsion system 200. As shown in FIG. 1A, the exemplary aircraft may be a rotary-wing aircraft. The rotary-wing aircraft 100 shown in FIG. 1A includes an airframe 102 and a plurality of engines 104. The plurality of engines 104 form a part of the propulsion system 200. As shown, the plurality of engines 104 includes a first engine 106 and a second engine 108, which may be turbomachines. The first and/or second engines 106, 108 generate and transmit torque to drive a main rotor assembly 110 and a tail rotor assembly 112. When the first and/or second engines 106, 108 are turbomachines, additional thrust may be generated by discharging exhaust gasses from the turbomachines through one or more exhaust nozzles 114, 116. The main rotor assembly 110 includes a plurality of main rotor blades 118, and rotation of the main rotor blades 118 generates lift for the aircraft 100. The tail rotor assembly 112 includes a plurality of tail rotor blades 120, and rotation of the tail rotor blades 120 counteracts torque exerted on the airframe 102 by rotation of the main rotor assembly 110.

FIG. 1B shows another exemplary aircraft 100 in accordance with another embodiment of the present disclosure. As shown in FIG. 1B, the exemplary aircraft is a fixed-wing aircraft. The fixed-wing aircraft 100 shown in FIG. 1B includes an airframe 102, and a propulsion system 200 that includes a plurality of engines 104 and an engine control system 300 configured to control the operations of the plurality of engines 104, which may be turbomachines. As shown, the plurality of engines 104 includes a first turbomachine 106 and a second turbomachine 108. The first and/or second turbomachines 106, 108 generate and transmit torque, which may drive a fan assembly 122 and various stages of the respective turbomachines 106, 108. Exhaust gasses discharged through one or more exhaust nozzles (not shown) generate thrust for the aircraft 100 while a wing assembly including a first port side wing 124 and a second starboard size wing 126 provide lift for the aircraft 100.

Figure 2A:
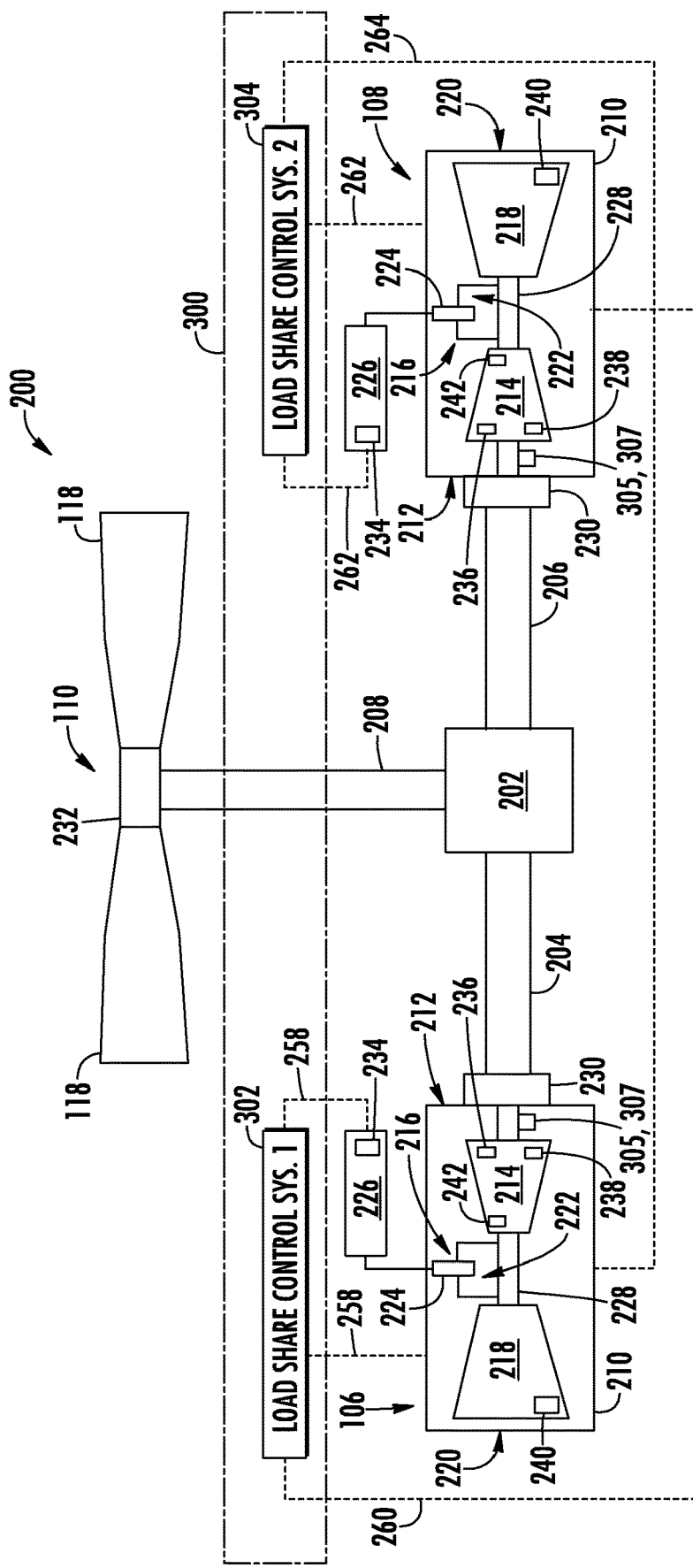
FIGS. 2A and 2B schematically depict exemplary propulsion system with multiple engines respectively corresponding to the aircraft in FIGS. 1A and 1B.
Figure 2B:
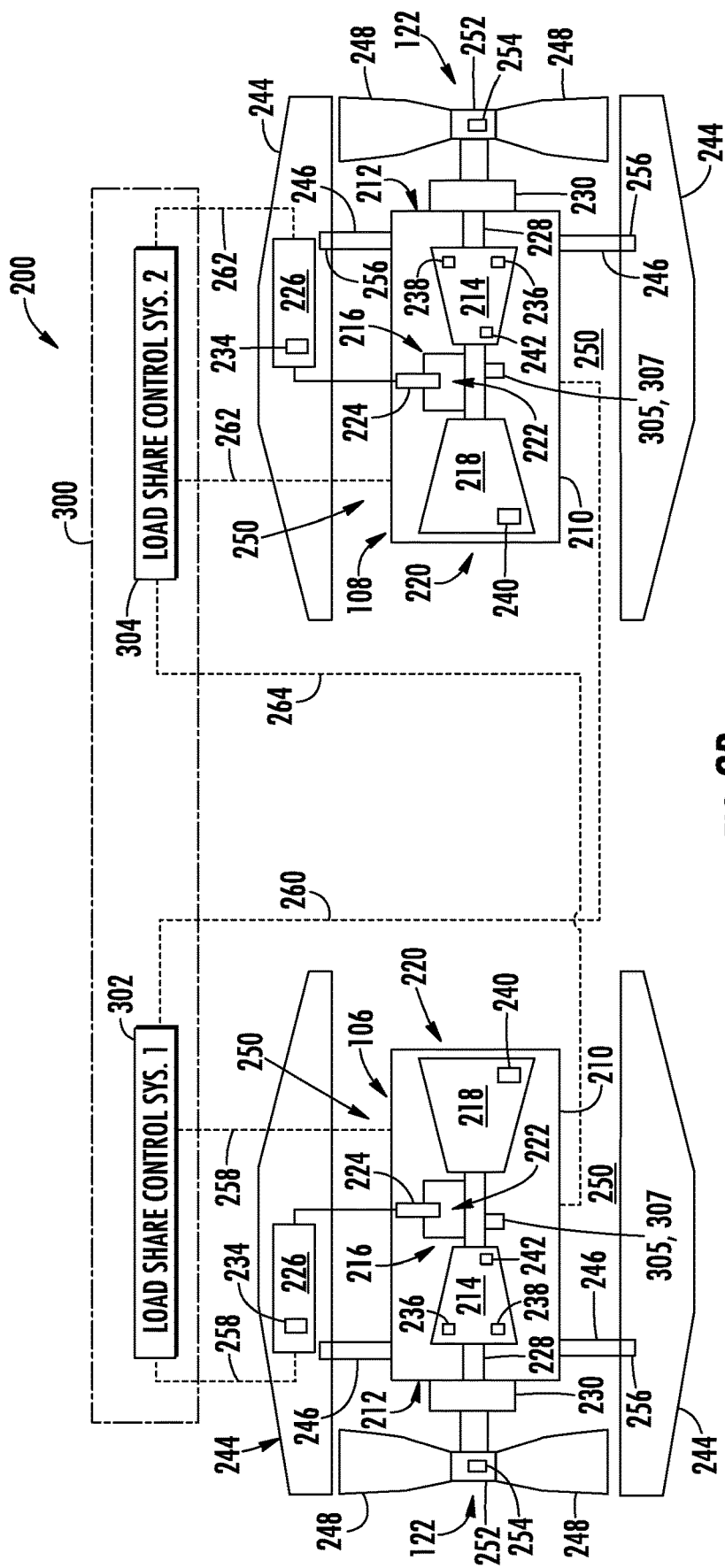

FIGS. 2A and 2B show exemplary propulsion systems 200 corresponding to the aircraft in FIGS. 1A and 1B, respectively. As shown in FIG. 2A, an exemplary propulsion system 200 for a rotary-wing aircraft 100 may include two turbomachines 106, 108 such as turboshaft engines operably coupled to a gearbox 202 via an output shaft 204, 206. For example, a first output shaft 204 may operably couple the first turbomachine 106 to the gearbox 202, and a second output shaft 206 may operably couple the second turbomachine 108 to the gearbox 202. The gearbox 202 may be a main reduction gearbox or any other suitable gearbox. The main rotor assembly 110 may be coupled to the gearbox 202 via a rotor shaft 208.

The propulsion system 200 may include any suitable engine. As shown, the first and second engines 106, 108 are a turbomachine. An exemplary turbomachine 106, 108 may include an outer casing 210 that defines an inlet 212 configured to direct a stream of flow into the turbomachine 106, 108. The outer casing 210 may encase, in serial flow relationship, a compressor section 214, a combustion section 216, a turbine section 218, and an exhaust section 220. Although not depicted, the compressor section may include, by way of example, a high pressure compressor section, or a low pressure compressor section followed by a high pressure compressor section. One or more compressor sections 214 may further include an annular array of inlet guide vanes, one or more sequential stages of compressor blades, a stage of centrifugal rotor blades, and a plurality of fixed or variable stator vanes which collectively defines a compressed air path.

The combustion section 216 generally includes a combustion chamber 222 and one or more fuel nozzles 224 extending into the combustion chamber 222. An exemplary turbomachine 106, 108 further includes a fuel delivery system 226 configured to provide fuel to the one or more fuel nozzles 224, which, in turn, supply fuel to mix with compressed air from the compressor section 214 entering the combustion chamber 222. The mixture of fuel and compressed air is ignited within the combustion chamber 222 to form combustion gases. The combustion gases drive both the turbine section 218 and at least a portion of the compressor section 214.

The turbine section 218 may be drivingly coupled to the compressor section 214 via a turbine shaft 228. Although not depicted, the turbine section 214 may include a high pressure turbine section followed by a low pressure turbine section, with each including one or more sequential stages of turbine rotor blades. A low pressure turbine section 218 may be drivingly coupled to a low pressure compressor section 214 via a low pressure turbine shaft 228. A high pressure turbine section 218 may be drivingly coupled a high pressure compressor section 214 via a high pressure turbine shaft 228.

During operation, the combustion gases drive the one or more turbine sections 218. As the one or more turbine sections 218 rotate, torque is transferred to a turbine shaft 228, drivingly rotating the compressor section 218. The turbine spool may be coupled to the output shaft 204 via a turbomachine gearbox 230, generating torque to rotate the main rotor assembly 110. The main rotor assembly 110 includes a swashplate 232 or the like configured to collectively vary the pitch of the main rotor blades 118 so as to adjust the thrust or lift derived from the main rotor blades. Additionally, hot combustion gasses may be discharged through one or more nozzles of the exhaust section 220, providing propulsive thrust.

The output power of the turbomachine 106, 108 in the form of torque and/or thrust may be modulated by controlling any one or more controllable components. For example, torque or thrust may be modulated by varying the fuel flow to the one or more fuel nozzles 224, for example by controlling one or more corresponding fuel valves 234. Additionally, or in the alternative, torque or thrust may be modulated by varying one or more variable geometry components, including one or more variable position guide vanes 236, one or more variable position compressor blades (e.g., stator or rotor blades) 238, and/or one or more variable position turbine blades (e.g., stator or rotor blades) 240. Further, torque or thrust may be modulated by varying bleed air flow from the compressor section 214, such as by controlling a bleed valve 242. Even further, the thrust or lift of the propulsion system may be modulated by varying the collective pitch angle of the main rotor blades 118, such as by controlling the position of the swashplate 232.

As shown in FIG. 2B, an exemplary propulsion system 200 for a fixed-wing aircraft 100 may include two turbomachines 106, 108 such as turbofan engines, which may be configured as described above. The turbomachines 106, 108 may be housed in an outer fan casing or nacelle 244 that circumferentially surrounds at least a portion of the fan assembly 122 and/or at least a portion of the turbomachine 106, 108. The fan casing or nacelle 244 may be supported relative to the turbomachine 106, 108 by a plurality of circumferentially-spaced outlet guide vanes 246. During operation, a stream of air enters the fan assembly, passing across a plurality of fan blades 248. A first portion of the air stream is directed or routed into the turbomachine through the inlet 212, while a second portion of the air stream is directed or routed into a bypass airflow passage 250 between the inner circumference of the nacelle 244 and the outer casing 210 of the turbomachine 106, 108. While hot combustion gasses discharging from the exhaust section 220 provide propulsive thrust, simultaneously the pressure of the stream of air in the bypass airflow passage 250 is substantially increased as the stream of air passes therethrough before it is exhausted from the exhaust section 220, also providing propulsive thrust.

The flowrate of air through the turbomachine 106, 108 impacts temperatures and pressures inside the turbomachine, which in turn, impacts the output power such as torque or thrust of the turbomachine. The ratio between the amount of airflow through the bypass airflow passage 250 to the amount of airflow through the turbomachine through the inlet 212 is known as a bypass ratio. The bypass ratio may be varied by controlling the relative pressure between the bypass airflow passage 250 and the inlet 212, such as by controlling one or more variable geometry components. Such variable geometry components may include one or more fan blades 248, which may be coupled to a disk 252 that includes a pitch control mechanism 254 configured to collectively vary the pitch of the fan blades 248. Additionally, or in the alternative, such variable geometry components may include one or more variable position guide vanes 236, one or more variable position compressor blades (e.g., stator or rotor blades) 238, and/or one or more variable position turbine blades (e.g., stator or rotor blades) 240. Further, such variable geometry components may include one or more outlet guide vanes 246 operably coupled to a pitch change mechanism 256 configured to vary the pitch of the outlet guide vanes 246.

It should be appreciated that the exemplary propulsion systems 200 and the various features thereof shown in FIGS. 2A and 2B are provided for illustrative purposes and not to be limiting. In fact, numerous other propulsion systems 200 may be provided, including turbomachines or other engines with other suitable configurations without departing from the spirit and scope of the present disclosure. For example, in other exemplary embodiments, aspects of the present disclosure may be incorporated into, e.g., a turbofan engine, a turboprop engine, a turboshaft engine, or a turbojet engine. Further, in still other embodiments, aspects of the present disclosure may be incorporated into any other suitable turbomachine, including, without limitation, a wind turbine, a steam turbine, a centrifugal compressor, and/or a turbocharger.

Regardless of the particular propulsion system 200, an engine control system 300 may be provided to control the propulsion system. As examples, the engine control system 300 may be or include a full authority digital engine control (FADEC) system, an electronic engine controller (EEC), an electronic control unit (ECU), or the like. The engine control system 300 may be located in any suitable location, such as on or with a housing for the engine 106, 108, in proximity to one or more components of the propulsion system 200, or in the case of an aircraft, anywhere within the airframe 102 of the aircraft. The engine control system 300 receives multiple input variables of current engine conditions from one or more distributed control modules. These input variables may include shaft speed, output torque, air density, throttle level, engine temperatures, engine pressures, among others. Operating parameters for the propulsion system 200 are computed and controlled based at least in part on these input variables. The engine control system 300 may output control commands to one or more controllable components of the engines 106, 108. For example, an engine control system 300 may control operating parameters such as fuel flow (i.e. throttle), guide vane positions, bleed valve positions, engine starting and restarting, among other things, based on algorithms that depend on various input variables.

The engine control system 300 may include one or more load share control systems configured and arranged to control the power output of one or more engines 106, 108. As shown in FIGS. 2A and 2B, engine control system 300 may include a first load share control system 302 corresponding to the first engine 106, and a second load share control system 304 corresponding to the second engine 108. While two engines and corresponding load share control systems are depicted, it will be appreciated that a propulsion system 200 may include any number of engines and corresponding load share control systems, such as three, four, five, six, or even more engines and corresponding load share control systems. As depicted, a separate load share control system 302, 304 may be provided for each engine 106, 108. However, it is also contemplated that one load share control system 302, 304 may be configured and arranged for controlling the power output of a plurality of engines 106, 108. The exemplary engine control system 300 may be communicatively coupled to the engines 106, 108 via a wired or wireless communication network.

The first load share control system 302 may be communicatively coupled to the first engine 106 via a first one or more wired or wireless communication links 258 so as to receive input variables from the first engine and to output control commands to the first engine 106. For example, the first load share control system 302 may be configured to output a control command to the fuel delivery system 226 for the first engine 106 so as to modulate fuel flow to the one or more fuel nozzles 224 thereof. Additionally, the first load share control system 302 may be communicatively coupled to the second engine 108 via a second wired or wireless communication links 260, so as to receive one or more input variables associated therewith. The first load share control system 302 may thereby output control commands to the first engine 106 based at least in part on one or more input variables associated with the second engine 108.

The second load share control system 304 may be communicatively coupled to the second engine 108 via a third wired or wireless communication links 262 so as to receive input variables from the second engine and to output control commands to the second engine 108. For example, the second load share control system 304 may be configured to output a control command to the fuel delivery system 226 for the second engine 108 so as to modulate fuel flow to the one or more fuel nozzles 224 thereof. Additionally, the second load share control system 304 may be communicatively coupled to the first engine 106 via a fourth wired or wireless communication links 264, so as to receive one or more input variables associated therewith. The second load share control system 304 may thereby output control commands to the second engine 108 based at least in part on one or more input variables associated with the first engine 106.

The communicative coupling between the first load share control system 302 and the second engine 108 may be provided by communicatively coupling the first load share control system 302 with the second load share control system 304 and/or by communicatively coupling the first load share control system 302 directly with the second engine 108. Likewise, the communicative coupling between the second load share control system 304 and the first engine 106 may be provided by communicatively coupling the second load share control system 304 with the first load share control system 302, and/or by communicatively coupling the second load share control system 304 directly with the first engine 106.

Figure 3:
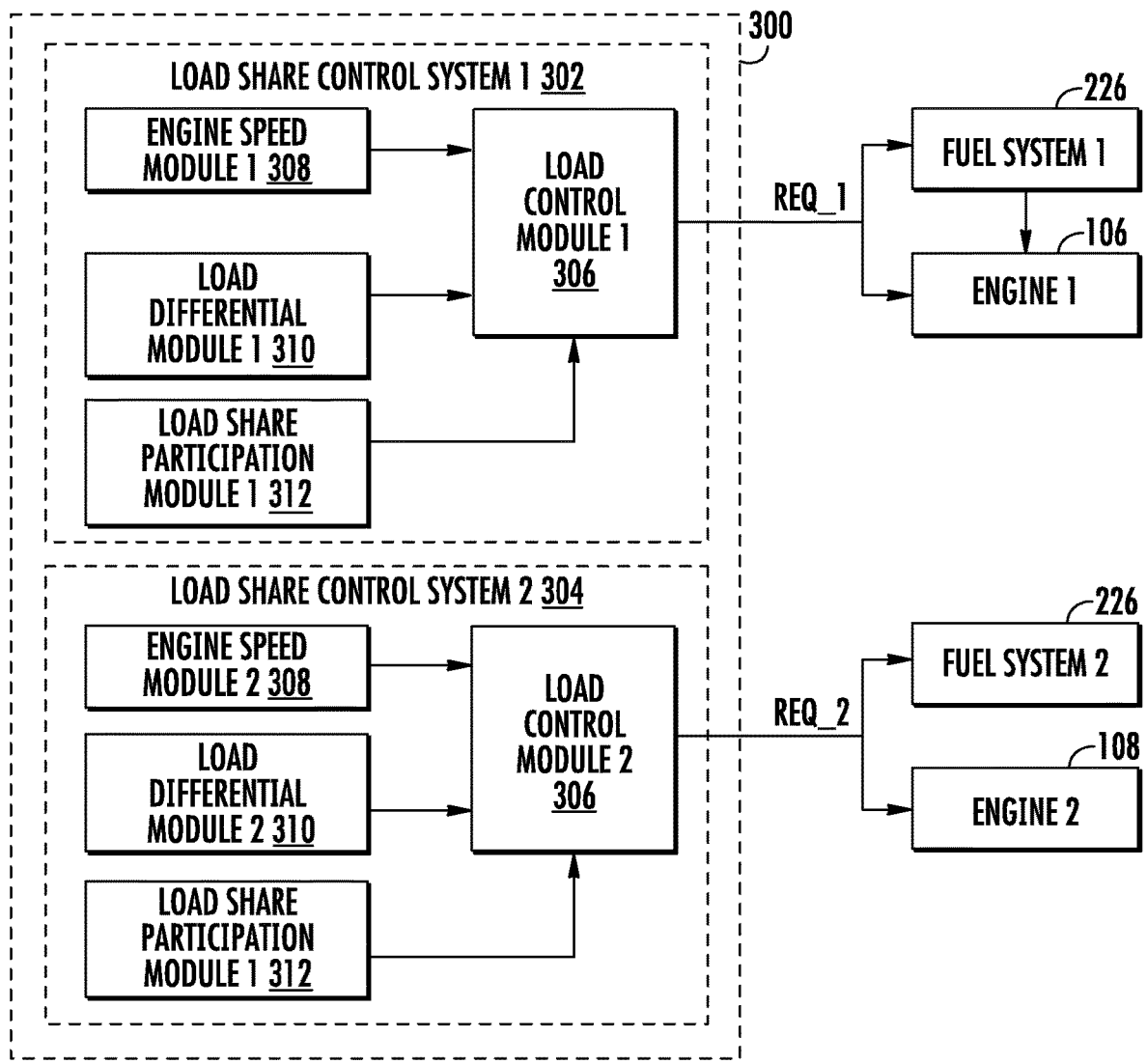
FIG. 3 schematically depicts an exemplary engine control system.

Now turning to FIG. 3, an exemplary engine control system 300 will be described. As shown, an engine control system 300 may include a plurality of load share control systems respectively corresponding to one of the engines of the propulsion system 200. For example, a first load share control system 302 may correspond to the first engine 106 and a second load share control system 304 may correspond to the second engine 108. Each load share control system 302, 304 may be configured to output a control command to the respective corresponding engine and/or to a system or systems associated therewith. An exemplary load share control system 302, 304 includes a load control module 306 configured to output one or more control commands associated with a load sharing and speed requirement of the corresponding engine 106, 108. The load control module 306 may receive an input from an engine speed module 308, a load differential module 310, and/or a load share participation module 312. The one or more control commands output by the load control module 306 may be based at least in part on the inputs received by the load control module 306 from the engine speed module 308, the load differential module 310, and/or the load share participation module 312.

The engine speed module 308 may be configured to receive and process one or more inputs corresponding to engine speed and to output an engine speed value to the load control module 306 based at least in part on the one or more processed inputs. For example, the engine speed module 308 may receive an engine speed value from one or more speed sensors 307 configured to measure the rotational speed of the turbine shaft 228, the output shaft 204, and/or the rotor shaft 208. Such an engine speed value may be provided to the engine speed module 308 directly from one or more speed sensors 307 or indirectly from another portion of the engine control system 300.

The load differential module 310 may be configured to receive and process one or more inputs corresponding to the torque and/or thrust of one or more engines of the propulsion system 200 and to output a load share differential value to the load control module 306 based at least in part on the one or more processed inputs. The load share differential may reflect a difference between the torque output of the first engine 106 and the second engine 108, and/or a difference between the thrust output of the first engine 106 and the second engine 108.

The load differential module 310 of the first load share control system 302 may receive one or more inputs corresponding to the torque and/or thrust of the second engine 108 either directly from one or more sensors or indirectly from another portion of the engine control system 300. For example, one or more sensors may be operably configured to measure the torque of the turbine shaft 228, the output shaft 204, and/or the rotor shaft 208 corresponding to the second engine 108. As another example, one or more control models may be operably configured to calculate thrust based at least in part on one or more operating conditions of the second engine 108.

The load differential module 310 of the second load share control system 304 may receive one or more inputs corresponding to the torque and/or thrust of the first engine 106 either directly from a torque sensor 305 or indirectly from another portion of the engine control system 300. For example, one or more sensors may be operably configured to measure the torque of the turbine shaft 228, the output shaft 204, and/or the rotor shaft 208 corresponding to the first engine 106. As another example, one or more control models may be operably configured to calculate thrust based at least in part on one or more operating conditions of the first engine 106.

The load share differential value output by the load differential module 310 of the first load share control system 302 may be processed by the load control module 306 of the first load share control system 302 so as to output to the first engine 106 and/or a system associated therewith, one or more control commands pertaining to a load sharing requirement of the first engine 106. The load share differential value output by the load differential module 310 of the second load share control system 302 may be processed by the load control module 306 of the second load share control system 302 so as to output to the second engine 108 and/or a system associated therewith, one or more control commands pertaining to a load sharing requirement of the second engine 106.

The load share participation module 312 may be configured to receive and process one or more inputs corresponding to operating conditions of one or more of the other engines of the propulsion system 200, and to output a load share participation value to the load control module 306 based at least in part on the one or more processed inputs. The load share participation module 312 of the first load share control system 302 may receive and process one or more inputs corresponding to operating conditions of the second engine 108 and output a load share participation value to the load control module 306 of the first load share control system 302. The load share participation value may include an indication as to whether or the extent to which the first engine 106 may participate in load sharing by executing one or more control command configured to increase and/or decrease torque and/or thrust of the first engine 106. The load share participation module 312 of the second load share control system 302 may receive and process one or more inputs corresponding to operating conditions of the first engine 106 and output a load share participation value to the load control module 306 of the second load share control system 302. The load share participation value for the second engine 108 may include an indication as to whether or the extent to which the second engine 108 may participate in load sharing by executing one or more control command configured to increase and/or decrease torque and/or thrust of the second engine 108.

The inputs to the load share participation module 312 may include one or more inputs corresponding to operating conditions of one or more of the other engines of the propulsion system 200, such as engine temperature, engine pressure, throttle level, shaft speed, torque output, thrust output, and so forth. The inputs one or more inputs to the load share participation module may additionally or alternatively include an alarm or status indicator, such an indication as to whether the engine is operating normally or whether there may be a problem with the engine. Such alarm may include a high temperature alarm, a high pressure alarm, a high torque alarm, an engine failure alarm, and so forth. Such a status indicator may include a normal temperature indicator, a normal pressure indicator, a normal torque indicator, an engine operating normal indicator, and so forth.

The output from the load share participation module may include an indication corresponding to one of a plurality of load share participation regimes. A first load share participation regime may be a full-participation load share regime, whereby an engine may fully participate in load sharing by either increasing torque or decreasing torque, as applicable, so as to more closely match the torque of one or more of the other engines of the propulsion system 200. For example, if the second engine 108 were operating at a lower torque than the first engine 106, a full-participation load share regime may allow the first engine 106 to decrease torque while the second engine 108 increases torque so as to more closely match one another while maintaining the overall torque of the propulsion system 200. Additionally, or in the alternative, an engine may fully participate in load sharing by either increasing thrust or decreasing thrust, as applicable, so as to more closely match the thrust of one or more of the other engines of the propulsion system 200.

The first engine 106 may utilize a full-participation load share regime when the corresponding load share participation module 312 ascertains that the second engine 108 is operating normally and capable of also fully participating in load sharing. The full-participation load share regime may be unutilized by the first engine 106 when the load share participation module 312 ascertains that the second engine 108 may be operating abnormally and/or may be incapable of also fully participating in load sharing. The second engine 108 may utilize a full-participation load share regime when the corresponding load share participation module 312 ascertains that the first engine 106 is operating normally and capable of also fully participating in load sharing. The full-participation load share regime may be unutilized (i.e., not utilized) by the second engine 108 when the load share participation module 312 ascertains that the first engine 108 may be operating abnormally and/or may be incapable of also fully participating in load sharing. By way of illustration, if the second engine 108 were operating at a lower torque than the first engine 106 and the second engine 108 was incapable of increasing torque, a reduction in torque of the first engine 106 without a corresponding increase in torque by the second engine 108 would equate to an undesirable reduction in overall torque of the propulsion system 200.

A second load share participation regime may be a partial-participation load share regime, whereby an engine may partially participate in load sharing. A partial-participation load share regime may include one or more limitations or restrictions on load sharing relative to a full-participation load share regime. For example, a partial-participation load share regime may allow an engine to participate in load sharing by increasing torque but not by decreasing torque, and/or by increasing thrust but not decreasing thrust. Additionally, or in the alternative, a partial-participation load share regime may allow an engine to participate in load sharing by decreasing torque and/or thrust only in response to an increase in torque and/or thrust by the other engine(s). Further, a partial participation load share regime may additionally or alternatively delay the responsiveness of an engine's participating in load sharing. Such delay in responsiveness may provide more time for the other engine(s) to make load sharing adjustments and/or may prevent rapid changes in the total torque and/or thrust of the propulsion system 200 in the event that the other engine(s) fail to make a load sharing adjustment. An engine may utilize a partial-participation load share regime when the corresponding load share participation module 312 ascertains that the other engine may be operating abnormally and/or may be incapable of also fully participating in load sharing.

The load share of one or more engines (e.g., torque and/or thrust) may be controlled using any one or more controllable components. In some embodiments, load share may be controlled by varying the fuel flow to the one or more engines. Additionally, or in the alternative, load share may be controlled by varying the position of one or more variable geometry components, such as one or more variable position guide vanes 236, one or more variable position compressor blades (e.g., stator or rotor blades) 238, one or more variable position turbine blades (e.g., stator or rotor blades) 240, one or more variable position outlet guide vanes 246, and/or one or more variable position fan blades 248.

In some embodiments, the controllable components utilized to control load share may be selected based at least in part on the load share regime. For example, with a full-participating load share regime, any or all controllable components may be utilized to control load share, whereas with a partial-participation load share regime, only a subset of the controllable components may be utilized to control load share. Additionally, or in the alternative, a first one or more controllable components may be utilized to control load share with a full-participation load share regime, while a second one or more controllable components may be utilized to control load share in a partial-participation load share regime. For example, fuel flow may be utilized to control load share with a full-participation load share regime, whereas fuel flow may remain unutilized for purposes of controlling load share with a partial-participation load share regime. Additionally, or in the alternative, with a partial participation load share regime, one or more variable geometry components may be utilized to control load share, such as in lieu of utilizing fuel flow to control load share. In some embodiments, one or more variable geometry components may be utilized to control load share with a full-participation load share regime, such as in combination with utilizing fuel flow to control load share. In some embodiments, fuel flow may be utilized to control load share for purposes of making larger adjustments, while one or more variable geometry components may be utilized to control load share for purposes of making smaller, fine-tuning adjustments.

A third load share participation regime may be a non-participation load share regime, whereby an engine may be non-participating in load sharing, such that the engine will neither increase nor decrease torque and/or thrust for the purpose of attempting to more closely match that the other engine(s). A non-participation load share regime may be utilized, for example, when one or more engines, systems, or components associated therewith may be operating under more severe abnormal conditions such that partial-participation load share regime may be unsuitable. For example, in the event of a failed or faulty torque sensor, a non-participation load share regime may be appropriate so as to avoid disrupting the overall torque and/or thrust of the propulsion system because of the failed or faulty torque sensor.

Figure 4:
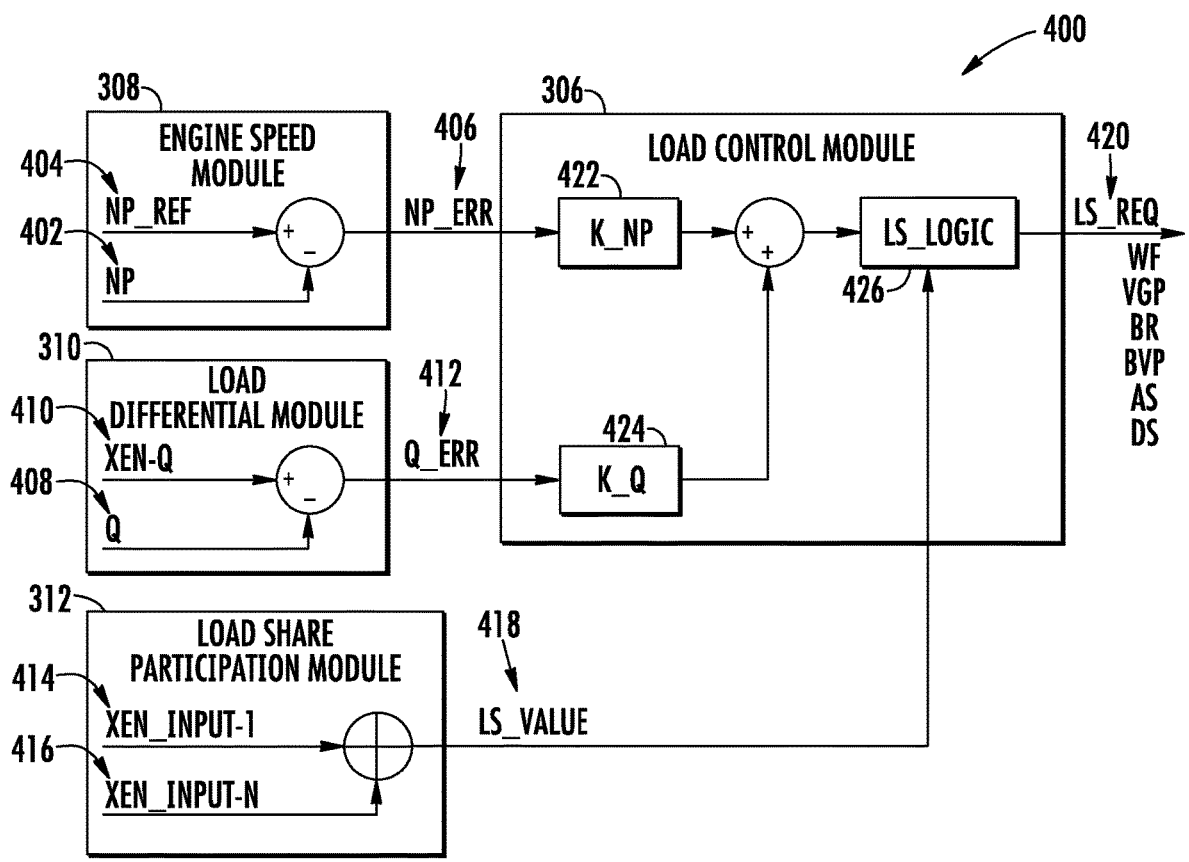
FIG. 4 schematically depicts an exemplary load share control system.

FIG. 4 schematically depicts an exemplary load share control system 400. The exemplary load share control system 400 may be implemented in first the load share control system 302 and/or the second load share control system 304 described above with reference to FIG. 3. As discussed, a load share control system 400 includes an engine speed module 308, a load differential module 310, a load share participation module 312, and a load control module 306.

An exemplary engine speed module 308 may be configured to compare an engine speed value (NP) 402 to an engine speed reference value (NP_REF) 404 and output an engine speed error value (NP_ERR) 406 to the load control module 306. The engine speed value (NP) 402 may be an actual or calculated engine speed. The engine speed reference value (NP_REF) 404 may be a set point for engine speed (i.e., the actual engine speed or the calculated engine speed). The engine speed error value (NP_ERR) 406 may be a difference between the engine speed reference value (NP_REF) 404 and the engine speed value (NP) 402. When the exemplary load share control system 400 is implemented in the first load share control system 302, the engine speed value (NP) 402 and the engine speed reference value (NP_REF) 404 may correspond to the first engine 106. When the exemplary load share control system 400 is implemented in the second load share control system 304, the engine speed value (NP) 402 and the engine speed reference value (NP_REF) 404 may correspond to the second engine 108.

An exemplary load differential module 310 may be configured to compare a torque value (Q) 408 corresponding to one engine to a cross-engine torque value (XEN-Q) 410 corresponding to another and output a torque error value (Q_ERR) 412 to the load control module 306. The torque value (Q) 408 and the cross-engine torque value (XEN-Q) 410 may be an actual or calculated value. The torque error value (Q_ERR) 412 may be a difference between the cross-engine torque value (XEN-Q) 410 and the torque value (Q) 408. Another exemplary load differential module 310 may be configured to compare a first estimated thrust value (Q)

408 corresponding to the first engine 106 to a second estimated thrust value (XEN-Q) 410 corresponding to the second engine 108, and output a thrust error value (Q_ERR) 412 to the load control module 306.

When the exemplary load share control system 400 is implemented in the first load share control system 302, the torque value (Q) 408 may correspond to the first engine 106 and the cross-engine torque value (XEN-Q) 410 may correspond to the second engine 108, and the torque error value (Q_ERR) 412 may be a difference between the torque of the second engine 108 and the torque of the first engine 106. When the exemplary load share control system 400 is implemented in the second load share control system 304, the torque value (Q) 408 may correspond to the second engine 108 and the cross-engine torque value (XEN-Q) 410 may correspond to the first engine 106, and the torque error value (Q_ERR) 412 may be a difference between the torque of the first engine 106 and the torque of the second engine 108.

An exemplary load share participation module 312 may be configured to analyze one or more inputs corresponding to operating conditions so as to ascertain whether or the extent to which one or more other engines of the propulsion system 200 may participate in load sharing. The load share participation module 312 may output a load share participation value to the load control module 306, indicating whether or the extent to which one or more other engines of the propulsion system 200 may participate in load sharing. The load share participation module 312 may analyze one or more cross-engine load share inputs (XEN_INPUT_1 to XEN-INPUT_N) for each of one or more other engines of the propulsion system 200. In some embodiments, the load share participation module 312 may analyze a first cross-engine load share input (XEN_INPUT-1) 414 corresponding to a first operating condition of an engine and/or an N-th cross-engine load share input (XEN_INPUT-N) 416 corresponding to a second operating condition of an engine. The load share participation module 312 may output a load share participation value (LS_VALUE) 418 to the load control module.

When the exemplary load share control system 400 is implemented in the first load share control system 302, the first cross-engine load share input (XEN_INPUT-1) 414 and/or an N-th cross-engine load share input (XEN_INPUT-N) 416 may correspond to operating conditions of the second engine 108, and the load share participation value (LS_VALUE) 418 may include an indication as to whether or the extent to which the first engine 106 may participate in load sharing. When the load share participation module 312 ascertains that the second engine 108 is operating normally and capable of also fully participating in load sharing (e.g., based at least in part on the first cross-engine load share input (XEN_INPUT-1) 414 and/or an N-th cross-engine load share input (XEN_INPUT-N) 416), the load share participation module 312 may output a load share participation value (LS_VALUE) 418 indicating that the first engine 106 may utilize a full-participation load share regime. When the load share participation module 312 ascertains that the second engine 108 is not operating normally (e.g., is operating abnormally and/or may be incapable of fully participating in load sharing), the load share participation module 312 may output a load share participation value (LS_VALUE) 418 indicating that the first engine 106 may utilize a partial-participation load share regime and/or a non-participating load share regime.

When the exemplary load share control system 400 is implemented in the second load share control system 304, the first cross-engine load share input (XEN_INPUT-1) 414 and/or an N-th cross-engine load share input (XEN_INPUT-N) 416 may correspond to operating conditions of the first engine 106, and the load share participation value (LS_VALUE) 418 may include an indication as to whether or the extent to which the second engine 108 may participate in load sharing. When the load share participation module 312 ascertains that the first engine 106 is operating normally and capable of also fully participating in load sharing (e.g., based at least in part on the first cross-engine load share input (XEN_INPUT-1) 414 and/or an N-th cross-engine load share input (XEN_INPUT-N) 416), the load share participation module 312 may output a load share participation value (LS_VALUE) 418 indicating that the second engine 108 may utilize a full-participation load share regime. When the load share participation module 312 ascertains that the first engine 106 is not operating normally (e.g., is operating abnormally and/or may be incapable of fully participating in load sharing), the load share participation module 312 may output a load share participation value (LS_VALUE) 418 indicating that the second engine 108 may utilize a partial-participation load share regime and/or a non-participating load share regime.

An exemplary load control module 306 may be configured to receive the engine speed error value (NP_ERR) 406, the torque error value (Q_ERR) 412, and the load share participation value (LS_VALUE) 418, and to output a load sharing requirement (LS_REQ) control command 420. The load sharing requirement (LS_REQ) control command 420 may include a single output or a plurality of outputs. Regardless of whether the load sharing requirement (LS_REQ) control command 420 happens to be a single output or a plurality of outputs, all or a portion of the load sharing requirement (LS_REQ) control command 420 may be attributable to one or more of the engine speed error value (NP_ERR) 406, the torque error value (Q_ERR) 412, and/or the load share participation value (LS_VALUE) 418. The engine speed error value (NP_ERR) 406 may be modulated according to an engine speed gain and/or filter (K_NP) 422. The torque error value (Q_ERR) 412 may be modulated according to a torque gain and/or filter (K_Q) 424. The engine speed error value (NP_ERR) 406 and the torque error value (Q_ERR) 412 may be combined (e.g., as respectively modified by the engine speed gain and/or filter (K_NP) 422 and the torque gain and/or filter (K_Q) 424), and the resulting combination may be subjected to load sharing logic (LS_LOGIC) 426. The load sharing logic (LS_LOGIC) 426 may perform one or more operations so as to output a load sharing requirement (LS_REQ) control command 420. With the engine speed error value (NP_ERR) 406 and the torque error value (Q_ERR) 412 may be combined, the bandwidth of the control loop may be increased while minimizing adverse coupling interactions. The present disclosure therefore allows for high bandwidth control loops, providing for increased responsiveness.

The load sharing logic (LS_LOGIC) 426 may output a load sharing requirement (LS_REQ) control command 420 based at least in part on the engine speed error value (NP_ERR) 406, the torque error value (Q_ERR) 412, and the load share participation value (LS_VALUE) 418. The load sharing logic (LS_LOGIC) 426 may receive and process the load share participation value (LS_VALUE) 418 and the resulting combination of the engine speed error value (NP_ERR) 406 and the torque error value (Q_ERR) 412 (e.g., as respectively modified by the engine speed gain and/or filter (K_NP) 422 and the torque gain and/or filter (K_Q) 424), and then output a load sharing requirement (LS_REQ) control command 420 that depends on the load share participation value (LS_VALUE) 418. The load sharing logic (LS_LOGIC) 426 may output a first load sharing requirement (LS_REQ) control command 420 when the load share participation value (LS_VALUE) 418 indicates that the first engine 106 may utilize a full-participation load share regime. The load sharing logic (LS_LOGIC) 426 may output a second load sharing requirement (LS_REQ) control command 420 when the load share participation value (LS_VALUE) 418 indicates that the first engine 106 may utilize a partial-participation load share regime. The load sharing logic (LS_LOGIC) 426 may output a third load sharing requirement (LS_REQ) control command 420 when the load share participation value (LS_VALUE) 418 indicates that the first engine 106 may utilize a non-participation load share regime. In some embodiments, the third load sharing requirement (LS_REQ) control command 420 corresponding to a non-participation load share regime may include the engine speed error value (NP_ERR) 406 and exclude the torque error value (Q_ERR) 412.

The load sharing requirement (LS_REQ) control command 420 may include or correspond to one or more control commands. For example, the load sharing requirement load sharing requirement (LS_REQ) control command 420 may trigger another portion of the engine control system 300 to output one or more control commands pertaining to the load sharing requirement (LS_REQ) control command 420. Alternatively, or additionally, the load sharing requirement load sharing requirement (LS_REQ) control command 420 may include one or more control commands. The one or more control commands corresponding to the load sharing requirement (LS_REQ) control command 420 may include any control command configured to change the torque and/or thrust of an engine 106, 108. As examples, the one or more control commands corresponding to the load sharing requirement (LS_REQ) control command 420 may include a control command configured to control a fuel flow (WF), a control command configured to control a variable geometry component position (VGP) (e.g., a variable fan blade position, a variable guide vane position, a variable compressor blade position, a variable turbine blade position, etc.) a control command configured to control a bypass ratio (BR), a control command configured to control a bleed valve position (BVP), a control command configured to control an acceleration schedule (AS), a control command configured to control a deceleration schedule (DS), and so forth.

Figure 5:
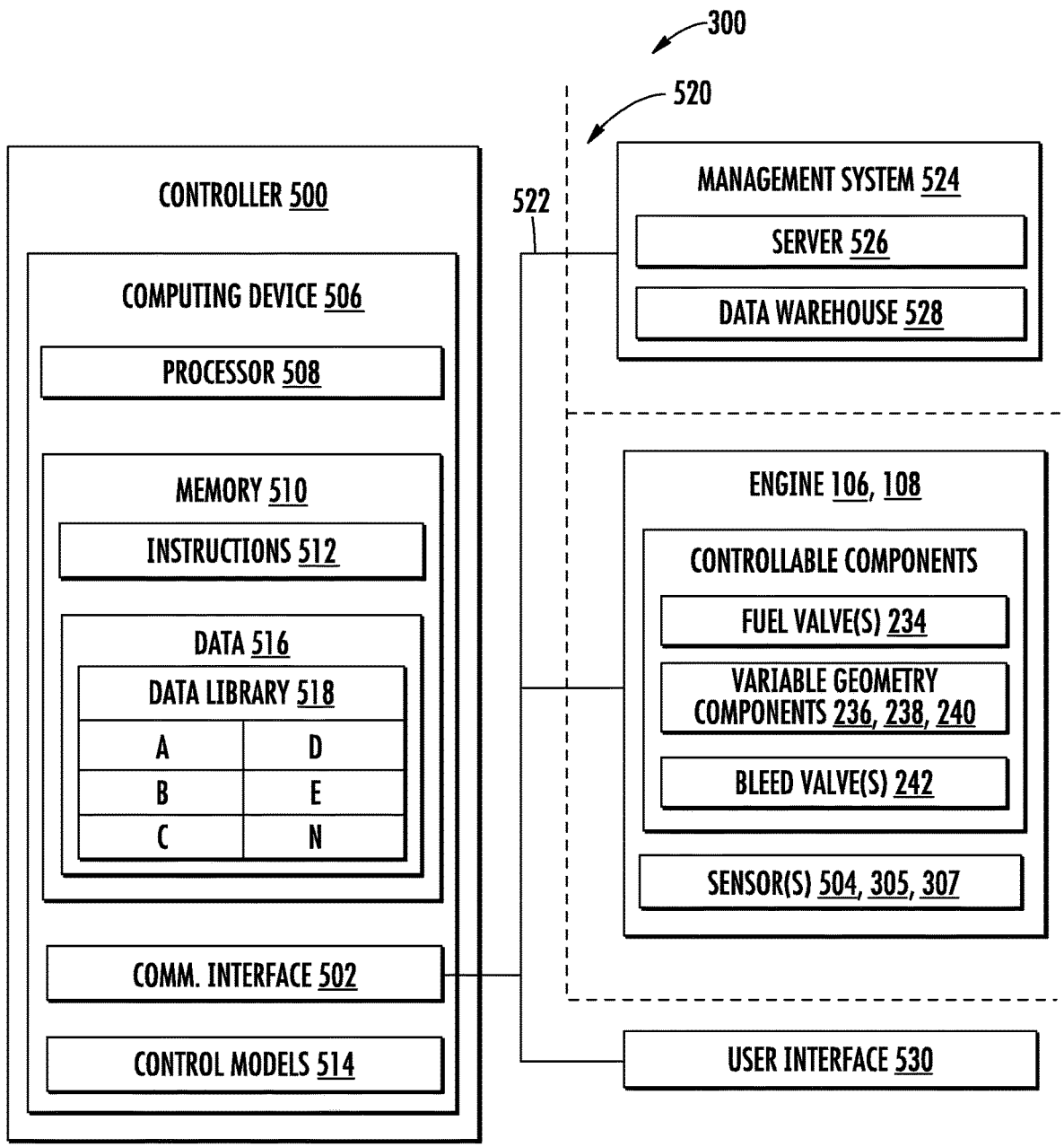
FIG. 5 shows a block diagram of an exemplary engine control system.

Now referring to FIG. 5, further aspects of an exemplary engine control system 300 will be described. An exemplary engine control system 300 includes a controller 500, which may be communicatively coupled to one or more engines 106, 108 via a communication interface 502. The controller 500 may be configured to receive a signal from one or more sensors 504, which may provide inputs corresponding to one or more engines of the propulsion system 200. The controller 500 may include one or more computing devices 506, which may be located locally or remotely relative to the one or more engines. The one or more computing devices 506 may include one or more processors 508 and one or more memory devices 510. The one or more processors 508 may include any suitable processing device, such as a microprocessor, microcontroller, integrated circuit, logic device, and/or other suitable processing device. The one or more memory devices 510 may include one or more computer-readable media, including but not limited to non-transitory computer-readable media, RAM, ROM, hard drives, flash drives, and/or other memory devices.

The one or more memory devices 510 may store information accessible by the one or more processors 508, including machine-executable instructions 512 that can be executed by the one or more processors 508. The instructions 512 may be any set of instructions which when executed by the one or more processors 508 cause the one or more processors 508 to perform operations. In some embodiments, the instructions 512 may be configured to cause the one or more processors 508 to perform operations for which the controller 500 and/or the one or more computing devices 506 are configured. Such operations may include receiving inputs from one or more sensors 504, and operating one or more control modules of the load share control system 400. Such operations may additionally or alternatively include controlling one or more controllable components, including, for example, one or more fuel valves 234 and/or one or more variable geometry components, such as in response to a load sharing requirement (LS_REQ) control command 420 output by a load share control system 400. Such operations may be carried out according to control commands provided by a control model 514. The machine-executable instructions 512 can be software written in any suitable programming language or can be implemented in hardware. Additionally, and/or alternatively, the instructions 512 can be executed in logically and/or virtually separate threads on processors 508.

The memory devices 510 may store data 516 accessible by the one or more processors 508. The data 516 can include current or real-time data, past data, or a combination thereof. The data 516 may be stored in a data library 518. As examples, the data 516 may include data associated with or generated by or associated with the load share control system 400 and/or the propulsion system 200, including data 516 associated with or generated by a controller 500, one or more controllable components, one or more sensors, and/or a computing device 506. The data 516 may also include other data sets, parameters, outputs, information, associated with the engine control system 300.

The communication interface 502 may be used for communications with a communications network 520 via wired or wireless communication lines 522. The communication network 520 may include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the controller 500 across the communication lines 522. The communication interface 502 may allow the computing device 506 to communicate with one or more sensors and/or with one or more controllable components of propulsion system 200.

The communication interface 502 may additionally or alternatively allow the computing device 506 to communicate with a management system 524, which may include a server 526 and/or a data warehouse 528. As an example, at least a portion of the data 516 may be stored in the data warehouse 528, and the server 526 may be configured to transmit data 516 from the data warehouse 528 to the computing device 506, and/or to receive data 516 from the computing device 506 and to store the received data 516 in the data warehouse 528 for further purposes. The server 526 and/or the data warehouse 528 may be implemented as part of an engine control system 300.

Further, the communication interface 502 may additionally or alternatively allow the computing device 506 to communicate with a user interface 530. The communication interface 502 may include any suitable components for interfacing with one or more network(s), including for example, transmitters, receivers, ports, controllers, antennas, and/or other suitable components. The communication lines 522 of communication network 520 may include a data bus or a combination of wired and/or wireless communication links.

In some embodiments, the engine control system 300 may be configured to output a control command is configured to cause a user interface 530 to display data 516 associated with the engine control system 300, such as data 516 associated with one or more load share control systems 302, 304. For example, the control command may cause the user interface 530 to display a status, trend, or alarm, such as responsive to a load share participation value (LS_VALUE) 418 or a load sharing requirement (LS_REQ) control command 420. Additionally, or in the alternative, the user interface 530 may display one or more values for one or more engines 106, 108 or related components of the propulsion system 200.

In some embodiments, the engine control system 300 may be configured to output a control command configured to cause the communication interface 502 to transmit data 516 to the management interface 428 associated with the propulsion system 200, the engine control system 300, and/or the load share control system 400. For example, a maintenance request may be transmitted to the management system 524. Additionally, or in the alternative, the management interface 428 may display a status, trend, or alarm, such as responsive to a load share participation value (LS_VALUE) 418 or a load sharing requirement (LS_REQ) control command 420. The management interface 428 may additionally or alternatively display one or more values for one or more engines 106, 108 or related components of the propulsion system 200.

Figure 6A:
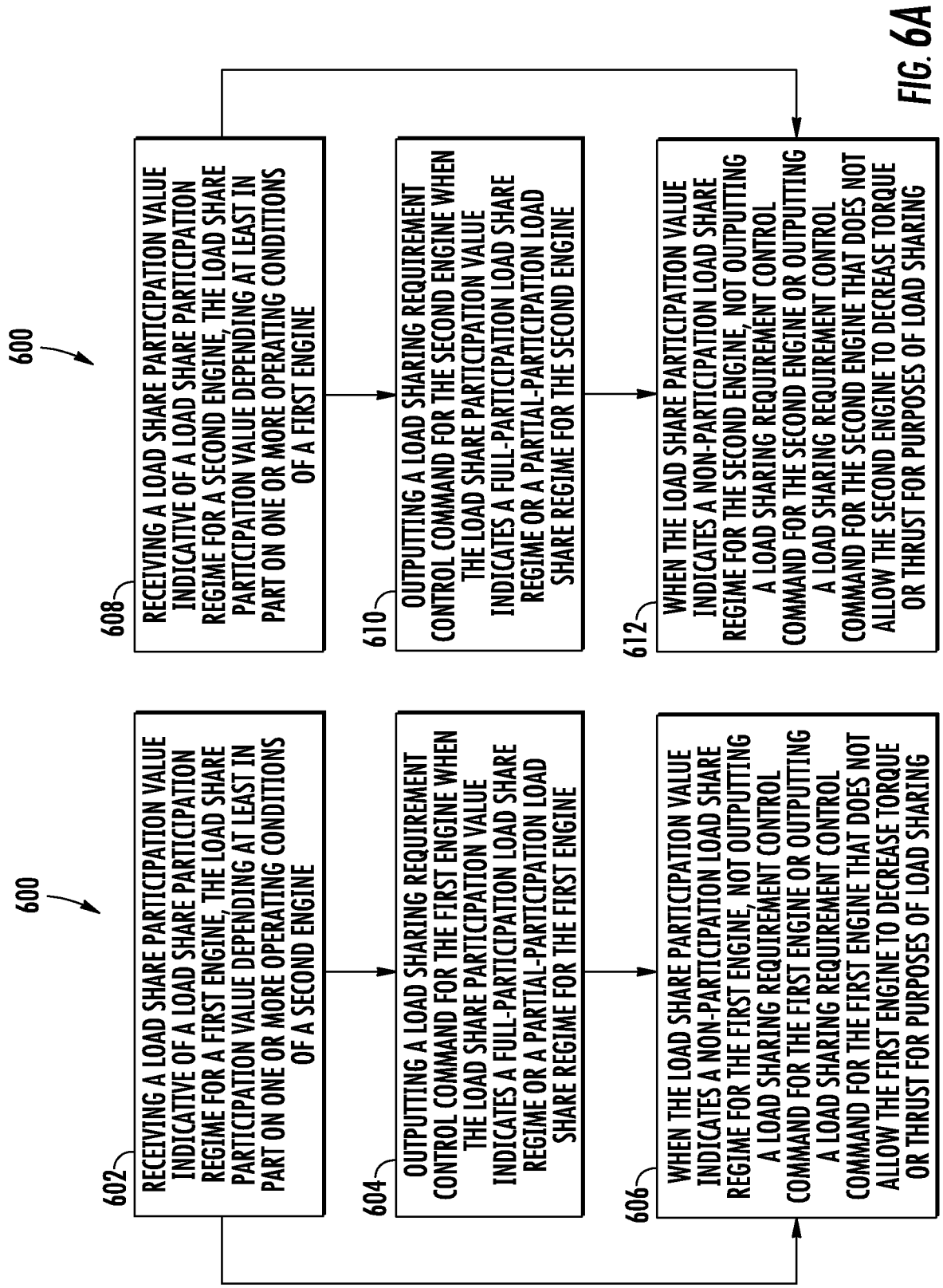
FIGS. 6A and 6B show flowcharts depicting exemplary methods of controlling load share of one or more engines.

Now turning to FIGS. 6A and 6B, exemplary methods of controlling load share between a plurality of engines will be described. Referring to FIG. 6A, an exemplary method 600 may include receiving a load share participation value indicative of a load share participation regime for a first engine, where the load share participation value depends at least in part on one or more operating conditions of a second engine 602. An exemplary method 600 may further include outputting a load sharing requirement control command for the first engine when the load share participation value indicates a full-participation load share regime or a partial-participation load share regime for the first engine 604. The load sharing requirement control command for the first engine may be configured to change a torque or thrust output of the first engine for purposes of load sharing. When the load share participation value indicates a non-participation load share regime for the first engine, the exemplary method 600 may include not outputting a load sharing requirement control command for the first engine or outputting a load sharing requirement control command for the first engine that does not allow the first engine to decrease torque or thrust for purposes of load sharing 606. For example, when the load share participation value indicates a non-participation load share regime for the first engine, the load sharing requirement control command for the first engine may cause a change in the torque or thrust of the first engine, but either prevents or does not cause a decrease in fuel flow to the first engine for purposes of load sharing. In some embodiments, with a non-participating load share regime, the load control module may output a load sharing requirement (LS_REQ) control command 420 that includes only an engine speed error value (NP_ERR) 406 component from the engine speed module 308, as modified by the engine speed gain and/or filter (K_NP) 422.

An exemplary method 600 may be performed as to the second engine concurrently or separately from the first engine. As for the second engine, an exemplary method 600 may include receiving a load share participation value indicative of a load share participation regime for a second engine, where the load share participation value depends at least in part on one or more operating conditions of a first engine 608. An exemplary method 600 may further include outputting a load sharing requirement control command for the second engine when the load share participation value indicates a full-participation load share regime or a partial-participation load share regime for the second engine 610. The load sharing requirement control command for the second engine may be configured to change a torque or thrust output of the second engine for purposes of load sharing. When the load share participation value indicates a non-participation load share regime for the second engine, the exemplary method 600 may include not outputting a load sharing requirement control command for the second engine or outputting a load sharing requirement control command for the second engine that does not allow the second engine to decrease torque or thrust for purposes of load sharing 612. For example, when the load share participation value indicates a non-participation load share regime for the second engine, the load sharing requirement control command for the second engine may cause a change in the torque or thrust of the first engine, but either prevents or does not cause a decrease in fuel flow to the first engine for purposes of load sharing.

Figure 6B:
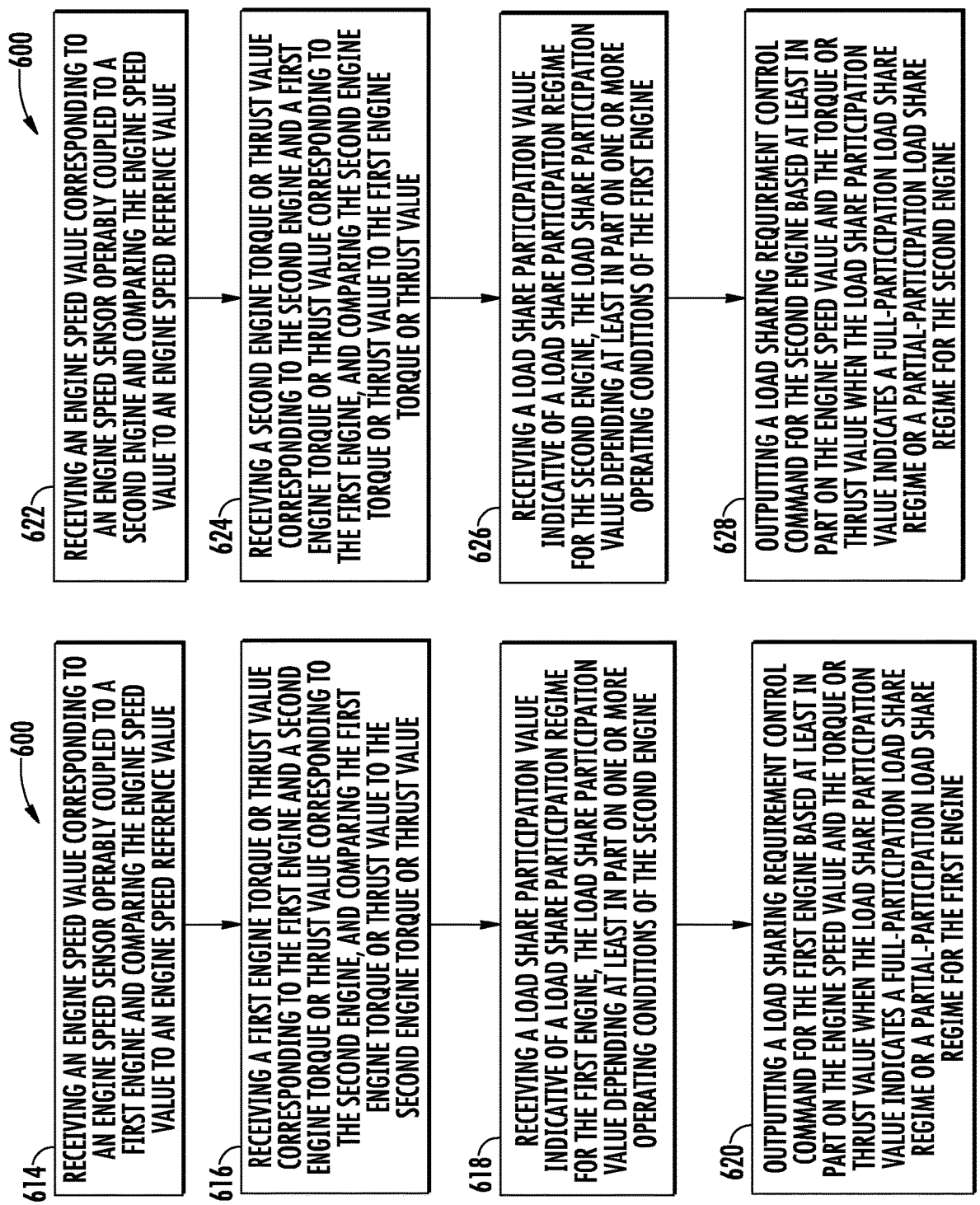

Referring to FIG. 6B, with respect to the first engine, an exemplary method 600 may include receiving an engine speed value corresponding to an engine speed sensor operably coupled to a first engine and comparing the engine speed value to an engine speed reference value 614. An exemplary method 600 may further include receiving a first engine torque or thrust value corresponding to the first engine and a second engine torque or thrust value corresponding to the second engine, and comparing the first engine torque or thrust value to the second engine torque or thrust value 616. An exemplary method 600 may further include receiving a load share participation value indicative of a load share participation regime for the first engine, where the load share participation value depends at least in part on one or more operating conditions of the second engine 618. An exemplary method 600 may further include outputting a load sharing requirement control command for the first engine based at least in part on the engine speed value and the torque or thrust value when the load share participation value indicates a full-participation load share regime or a partial-participation load share regime for the first engine 620.

With respect to the second engine, an exemplary method 600 may include receiving an engine speed value corresponding to an engine speed sensor operably coupled to a second engine and comparing the engine speed value to an engine speed reference value 622. An exemplary method 600 may further include receiving a second engine torque or thrust value corresponding to the second engine and a first engine torque or thrust value corresponding to the first engine, and comparing the second engine torque or thrust value to the first engine torque or thrust value 624. An exemplary method 600 may further include receiving a load share participation value indicative of a load share participation regime for the second engine, where the load share participation value depends at least in part on one or more operating conditions of the first engine 626. An exemplary method 600 may further include outputting a load sharing requirement control command for the second engine based at least in part on the engine speed value and the torque or thrust value when the load share participation value indicates a full-participation load share regime or a partial-participation load share regime for the second engine 628.

Figure 7A:
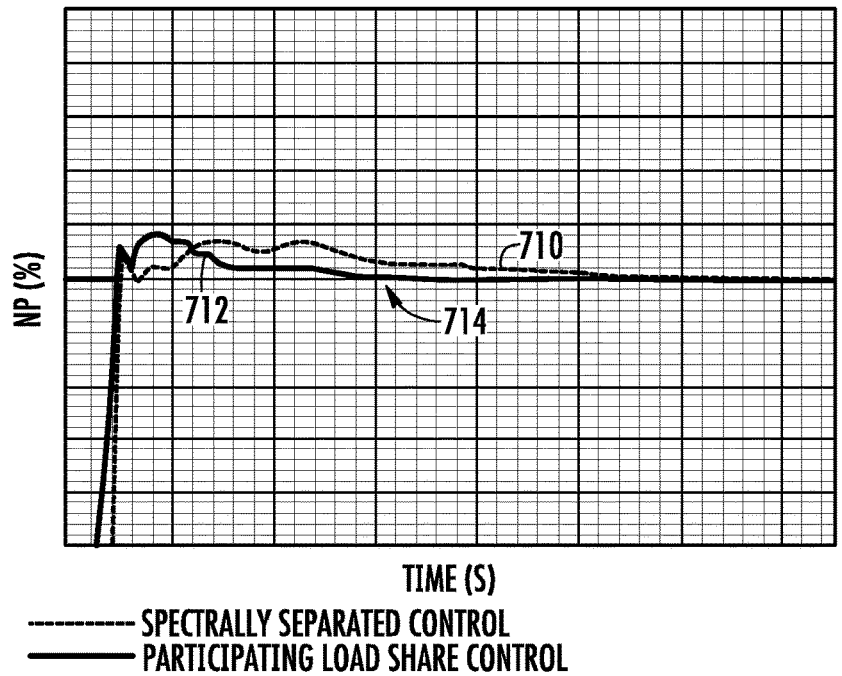
FIGS. 7A and 7B show graphs respectively depicting an exemplary engine speed transient-response and an exemplary engine torque transient response for a participating load share controller configured in accordance with the present disclosure relative to a spectrally separated engine speed and torque control.
Figure 7B:
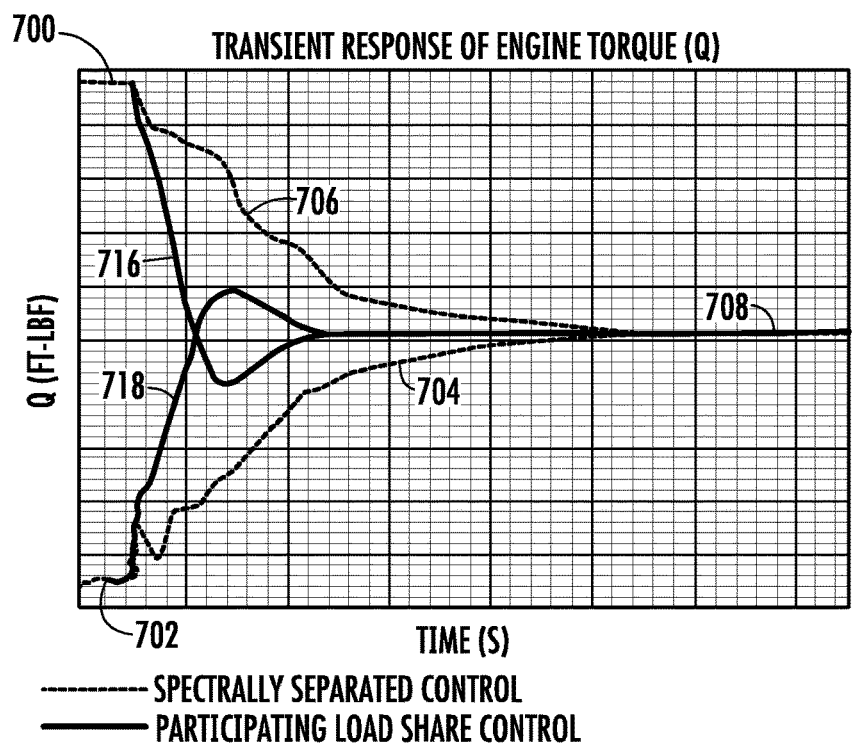

The presently disclosed systems and methods of controlling load share may provide faster response times. For example, FIGS. 7A and 7B graphically illustrate exemplary transient-responses for engine speed and engine torque for a participating load share controller relative to a spectrally separated engine speed and torque control. The transient response shown in FIGS. 7A and 7B represents an "idle-to-fly" transient response whereby a first engine 106 operates at a first initial torque 700 providing all of the torque or thrust needed to sustain flight while a second engine 108 operates at a second initial torque 702 corresponding to idle. The second engine 108 receives a control command causing the second engine 108 to transition from "idle" to "fly" such that the second engine 108 begins increasing torque. It will be appreciated that the transient response shown in FIGS. 7A and 7B may be illustrative of any transient response, and the "idle-to-fly" transient response as shown is not to be limiting.

As shown in FIGS. 7A and 7B, a spectrally separated spectrally separated engine speed and torque control provides a gradual transition to steady-state load sharing. As the second engine 108 outputs a gradually increasing torque 704, the first engine 106 outputs a gradually decreasing torque 706 under spectrally separated engine speed and torque control, eventually reaching a steady-state load share 708. Meanwhile, engine speed 710 experiences a minor disruption while the torque response transitions to steady state load share 708. By comparison, a participating load share control provides a much faster transient response, while engine speed experiences only a minor disruption 712 as the torque response transitions to steady state load share 714. It will be appreciated that any suitable control methodology may be utilized to obtain the response shown in FIGS. 7A and 7B without departing from the spirit and scope of the present disclosure.

With the participating load share control illustrated in FIGS. 7A and 7B, the load share participation module 312 ascertains that the second engine 108 is operating normally and capable of fully participating in load sharing, and therefore outputs a load share participation value (LS_VALUE) 418 corresponding to a full-participation load share regime. The load control module 306 receives the load share participation value (LS_VALUE) 418 from load share participation module 312, and outputs a output a load sharing requirement (LS_REQ) control command 420 to the first engine 106, causing or allowing the first engine to decrease torque 716 as the second engine increases toque 718 and thereby providing a faster transient response. Conversely, in the event that the load share participation module 312 had output a load share participation value (LS_VALUE) 418 corresponding to a non-participation load share regime (e.g., in the event of an abnormal operating condition of the second engine), then the load control module 306 may have not outputted a load sharing requirement (LS_REQ) control command 420 to the first engine 106, such that the first engine would not decrease torque for purposes of load sharing. Alternatively, the load control module 306 may have output a load sharing requirement (LS_REQ) control command 420 to the first engine 106 that similarly would not allow the first engine 106 to decrease torque for purposes of load sharing. In this way, the load share control system 400 would prevent a decrease in torque by the first engine 106 from decreasing the overall torque of the propulsion system 200. In the case of such non-participation load share regime, as the second engine 108 increased engine speed and torque, the torque of the first engine 106 would gradually decrease according to a spectrally separated engine speed and torque control.

Figure 8:
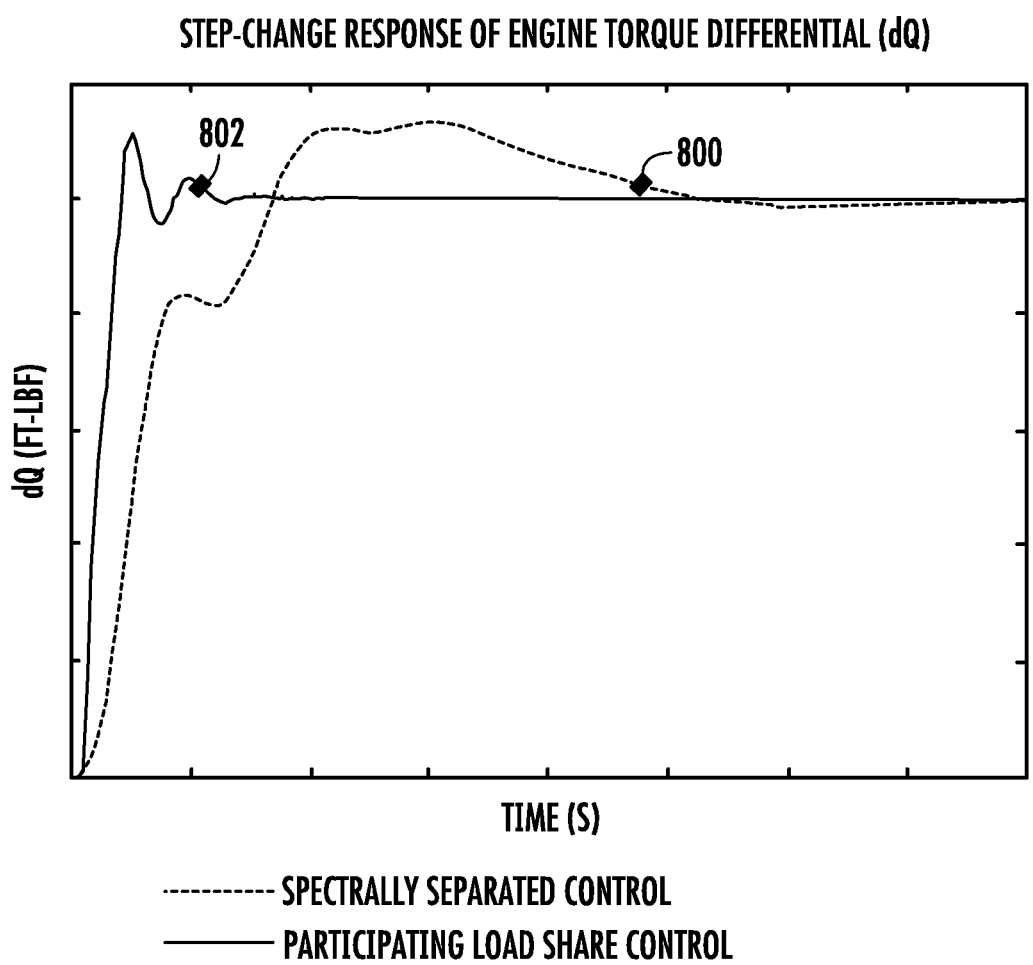
FIG. 8 shows a graph depicting an exemplary step response of engine torque differential for a participating load share controller configured in accordance with the present disclosure relative to a spectrally separated engine speed and torque control.

In addition to the transient response shown in FIGS. 7A and 7B, the presently disclosed methods of controlling load share may also provide faster response times to a step change. For example, as shown in FIG. 8, spectrally separated engine speed and torque control provides a gradual response 800 to a step change, whereas a participating load share controller provides a relatively faster response 802 to the step change. The step change response shown in FIG. 8 similarly exemplifies improved responsiveness relative to spectrally separated engine speed and torque control. It will be appreciated that any suitable control methodology may be utilized to obtain the response shown in FIG. 8 without departing from the spirit and scope of the present disclosure.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine control system, comprising:
a memory device and a processor, wherein the memory device comprises computer-executable instructions, which when executed by the processor, cause the engine control system to perform a method of controlling load share between a plurality of engines of a multiple engine propulsion system, comprising at least a first engine and a second engine, the method comprising:
determining, during operation of the multiple engine propulsion system, a load difference between a first load of the first engine and a second load of the second engine;
determining, during operation of the multiple engine propulsion system, a load share participation value indicative of a load share participation regime for the first engine, the load share participation value depending at least in part on one or more operating conditions of the second engine, wherein the load share participation value is determined to be one of:
a full-participation load share regime when the one or more operating conditions of the second engine indicate that the second engine is operating normally and is capable of control to reduce the load difference by actuating any of a plurality of controllable components of the second engine;
a partial-participation load share regime when the one or more operating conditions of the second engine indicate that the second engine has at least one first abnormal operating condition in which only a subset of the plurality of controllable components of the second engine may be utilized to reduce the load difference; and a non-participation load share regime when the one or more operating conditions of the second engine indicate that the second engine has at least one second abnormal operating condition in which none of the plurality of controllable components of the second engine may be utilized to reduce the load difference and is incapable of control to reduce the load difference based on the at least one second abnormal operating condition;

generating, during operation of the multiple engine propulsion system, a load sharing requirement control command for the first engine based on the load share participation value, wherein:

when the load share participation value is a partial-participation load share regime, the load sharing requirement control command includes at least one control command configured to control the first engine to reduce the load difference subject to at least one limitation on decreasing the first load of the first engine; and controlling the first engine based at least in part on the load sharing requirement control command to thereby reduce the load difference.

2. The engine control system of claim 1, wherein the computer-executable instructions, when executed, cause the engine control system to further perform the method including:

determining a speed difference between a first engine speed value corresponding to the first engine and a first engine speed reference value for the first engine;

wherein the first load is based on at least one of a first engine torque and first engine thrust value and the second load is based on at least one of a second engine torque and second engine thrust value;

wherein the load sharing requirement control command for a full-participation load share regime includes control to reduce the speed difference and to reduce the load difference.

3. The engine control system of claim 1, wherein the first engine and the second engine comprise turbomachine engines.

4. The engine control system of claim 3, wherein the first engine and the second engine comprise part of a propulsion system for a rotary-wing aircraft or a fixed-wing aircraft.

5. The engine control system of claim 1, wherein, when the load share participation value indicates the full-participation load share regime for the first engine, the load sharing requirement control command comprises at least one of:

a control command configured to control the fuel flow;
a control command configured to control one or more variable geometry components;
a control command configured to control a bleed valve position of the first engine;
a control command configured to change at least one of an acceleration schedule of the first engine and a deceleration schedule of the first engine; and
a control command configured to control a bypass ratio, the bypass ratio being a ratio of an amount of airflow through a bypass airflow passage to an amount of airflow through an inlet of the first engine.

6. The engine control system of claim 5, wherein the load sharing requirement control command comprises a control command configured to control one or more variable geometry components, the one or more variable geometry components comprising at least one of: one or more variable position guide vanes, one or more variable position compressor blades, one or more variable position turbine blades, one or more variable position outlet guide vanes, and one or more variable position fan blades.

7. The engine control system of claim 1, wherein, when the load share participation value indicates the partial-participation load share regime for the first engine, the at least one limitation includes preventing a decrease in at least one of the first engine torque and the first engine of the first engine for purposes of load sharing.

8. The engine control system of claim 1, wherein, when the load share participation value indicates the partial-participation load share regime for the first engine, the at least one limitation includes controlling a variable geometry component rather than the fuel flow.

9. The engine control system of claim 1, wherein the load sharing requirement control command for the first engine is configured to control the fuel flow only when the load share participation value indicates the full-participation load share regime for the first engine.

10. The engine control system of claim 1, wherein the first engine is controlled at least in part using a multi-input-single-output controller.

11. The engine control system of claim 1, wherein the first engine is controlled at least in part using a full authority digital engine control system, an electronic engine controller, or an electronic control unit.

12. The engine control system of claim 1, wherein, when the load share participation value indicates the partial-participation load share regime for the first engine, the at least one limitation includes allowing a decrease in at least one of a first engine torque and a first engine thrust of the first engine for purposes of load sharing only in response to an increase in at least one of a second engine torque and a second engine thrust of the second engine.

13. The engine control system of claim 1, wherein, when the load share participation value indicates the partial-participation load share regime for the first engine, the at least one limitation includes delaying participation of the first engine for purposes of load sharing with respect to participation of the second engine in load sharing.

14. A multiple engine propulsion system, comprising:
a first engine having:
one or more first sensors, the one or more first sensors configured to ascertain one or more first operating conditions associated with the first engine; and
one or more first controllable components, the at least one of the one or more first controllable components configured to change a torque or thrust output of the first engine, wherein a first load is based on the torque or thrust output of the first engine;
a second engine having:
one or more second sensors, the one or more second sensors configured to ascertain one or more operating conditions associated with the second engine; and
a second one or more controllable components associated therewith, the second one or more controllable components configured to change a torque or thrust output of the second engine, wherein a second load is based on the torque or thrust output of the second engine; and
a first engine control system comprising a memory device and a processor, wherein the memory device comprises computer-executable instructions, which when executed by the processor, cause the first engine control system to:
    determine, during operation of the multiple engine propulsion system, a load difference between the first load of the first engine and the second load of the second engine;
    determine, during operation of the multiple engine propulsion system, a load share participation value indicative of a load share participation regime for the first engine, the load share participation value based at least in part on the one or more operating conditions associated with the second engine, wherein the load share participation value is determined to be:
        a full participation load share regime when the one or more operating conditions of the second engine indicate that the second engine operating normally and is capable of control to reduce the load difference by actuating any of the second one or more controllable components of the second engine;
        a partial-participation load share regime when the one or more operating conditions of the second engine indicate that the second engine has at least one first abnormal operating condition in which only a subset of the second one or more controllable components of the second engine may be utilized to reduce the load difference; and
        a non-participation load share regime when the one or more operating conditions of the second engine indicate that the second engine has at least one second abnormal operating condition in which none of the second one or more controllable components of the second engine may be utilized to reduce the load difference;
    generate, during operation of the multiple engine propulsion system, a load sharing requirement control command for the first one or more controllable components based on the load share participation value, wherein:
        when the load share participation value is a partial-participation load share regime, the load sharing requirement control command includes controlling the first engine to reduce the load difference subject to at least one limitation on decreasing the load of the first engine;
        when the load share participation value indicates the partial-participation load share regime for the first engine, the at least one limitation includes delaying participation of the first engine for purposes of load sharing with respect to participation of the second engine in load sharing; and
    control the first one or more controllable components based at least in part on the load sharing requirement control command.

15. The multiple engine propulsions system of claim 14, wherein:
    the one or more first sensors comprise:
        at least one sensor configured to ascertain a speed of the first engine; and
        at least one sensor configured to ascertain a torque or thrust output of the first engine;
    the one or more second sensors comprise:
        at least one sensor configured to ascertain a speed of the second engine; and
        at least one sensor configured to ascertain a torque or thrust output of the second engine;
    wherein the first engine control system is configured to:
        determine the load difference based on:
            the torque or thrust output of the first engine; and
            the torque or thrust output of the second engine;
        determine a speed difference based on the speed of the first engine and a reference speed of the first engine;
        wherein the load sharing requirement control command for a full-participation load share regime includes control to reduce the load difference and to reduce the speed difference.

16. The multiple engine propulsions system of claim 14, comprising:
    a first output shaft operably coupling the first engine to a gearbox and a second output shaft operably coupling the second engine to the gearbox, the first engine and the second engine comprising turbomachine engines, and the gearbox operably coupled to a main rotor assembly of a rotary-wing aircraft.

17. The engine control system of claim 14, wherein, when the load share participation value indicates the partial-participation load share regime for the first engine, the at least one limitation includes restricting at least one of the one or more first controllable components for purposes of load sharing.

18. A non-transitory computer-readable medium comprising computer-executable instructions, which, when executed by a processor operably coupled to an engine control system, cause the engine control system to:
    determine, during operation of a multiple engine propulsion system, comprising at least a first engine and a second engine, a load difference between a first load of the first engine and a second load of the second engine;
    determine, during operation of a multiple engine propulsion system, a load share participation value indicative of a load share participation regime for the first engine, the load share participation value depending at least in part on one or more operating conditions of the second engine, wherein the load share participation value is determined to be:
        a full-participation load share regime when the one or more operating conditions of the second engine indicate that the second engine is operating normally and all controllable components of the second engine may be utilized to reduce the load difference;
        a partial-participation load share regime when the one or more operating conditions of the second engine indicate that the second engine has at least one first abnormal operating condition in which only a subset of the controllable components of the second engine, but not all of the controllable components of the second engine, may be utilized to reduce the load difference; and
        a non-participation load share regime when the one or more operating conditions of the second engine indicate that the second engine has at least one second abnormal operating condition in which none of the plurality of controllable components of the second engine may be utilized to reduce the load difference;
    generate, during operation of the multiple engine propulsion system, a load sharing requirement control command for the first engine based on the load share participation value, wherein:
        when the load share participation value is a partial-participation load share regime, the load sharing requirement control command includes controlling the first engine to reduce the load difference subject to at least one limitation on decreasing the load of the first engine;

when the load share participation value indicates the partial- participation load share regime for the first engine, the at least one limitation includes delaying participation of the first engine for purposes of load sharing with respect to participation of the second engine in load sharing; and control the first engine based at least in part on the load sharing requirement control command.

19. A non-transitory computer-readable medium of claim 18, comprising computer-executable instructions, which, when executed by a processor operably coupled to the engine control system, cause the engine control system to:

determine a speed difference between a first engine speed value corresponding to the first engine and a first engine speed reference value for the first engine;

wherein the first load is based on a first engine torque or thrust value and the second load is based on a second engine torque or thrust value; and wherein the load sharing requirement control command for a full-participation load share regime includes control to reduce the speed difference and to reduce the load difference.

20. The non-transitory computer-readable medium of claim 18, wherein the engine control system comprises a full authority digital engine control system, an electronic engine controller, or an electronic control unit, the processor being a component thereof.

* * * * *